United States Patent
Iisaka et al.

(10) Patent No.: US 8,198,754 B2
(45) Date of Patent: *Jun. 12, 2012

(54) POWER TRANSMISSION CONTROL DEVICE, POWER TRANSMITTING DEVICE, ELECTRONIC INSTRUMENT, AND NON-CONTACT POWER TRANSMISSION SYSTEM

(75) Inventors: Ken Iisaka, Chino (JP); Takahiro Kamijo, Fujimi-cho (JP); Kota Onishi, Nagoya (JP); Masayuki Kamiyama, Nagoya (JP); Nobutaka Shiozaki, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 824 days.

This patent is subject to a terminal disclaimer.

(21) Appl. No.: 12/273,893

(22) Filed: Nov. 19, 2008

(65) Prior Publication Data
US 2009/0133942 A1 May 28, 2009

(30) Foreign Application Priority Data

Nov. 22, 2007 (JP) ................................. 2007-303008

(51) Int. Cl.
*H01F 27/42* (2006.01)
(52) U.S. Cl. ........................................ 307/104
(58) Field of Classification Search .................. 307/104, 307/140
See application file for complete search history.

(56) References Cited

U.S. PATENT DOCUMENTS
2008/0197712 A1* 8/2008 Jin et al. ..................... 307/104

FOREIGN PATENT DOCUMENTS

| JP | A-6-169536 | 6/1994 |
|----|----|----|
| JP | A-10-260209 | 9/1998 |
| JP | A-2001-128375 | 5/2001 |
| JP | A-2001-275280 | 10/2001 |
| JP | A-2002-221567 | 8/2002 |
| JP | A-2005-237155 | 9/2005 |
| JP | A-2006-60909 | 3/2006 |
| JP | A-2006-230032 | 8/2006 |
| JP | A-2006-230129 | 8/2006 |
| JP | A-2007-231567 | 9/2007 |

OTHER PUBLICATIONS

U.S. Appl. No. 12/271,269, filed Nov. 14, 2008 in the name of Takahiro Kamijo et al.
U.S. Appl. No. 12/163,266, filed Jun. 27, 2008 in the name of Ken Iisaka et al.
U.S. Appl. No. 12/163,300, filed Jun. 27, 2008 in the name of Ken Iisaka et al.
U.S. Appl. No. 12/167,812, filed Jul. 3, 2008 in the name of Mikimoto Jin et al.

* cited by examiner

*Primary Examiner* — Robert L. Deberadinis
(74) *Attorney, Agent, or Firm* — Oliff & Berridge, PLC

(57) ABSTRACT

A power transmission control device provided in a power transmitting device of a non-contact power transmission system includes a driver control circuit that controls a power transmitting driver that drives a primary coil, a load state detection circuit that detects a power-receiving-side load state, and a control circuit that controls the power transmission control device. The control circuit acquires a reference value used to determine a power-receiving-side load state after starting normal power transmission in a reference value acquisition period, the reference value acquisition period being a period after receiving ID authentication information from the power receiving device, but before starting the normal power transmission.

14 Claims, 20 Drawing Sheets

FIG. 7A  LOW LOAD
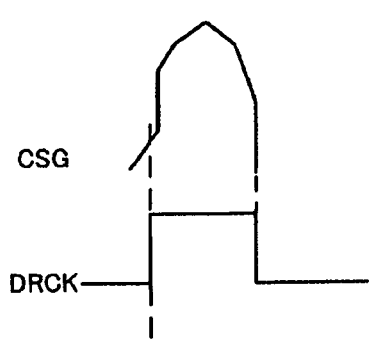
FIG. 7B  HIGH LOAD
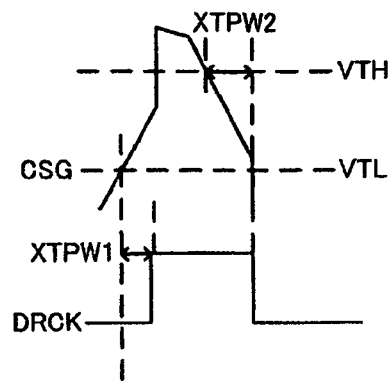
FIG. 7C
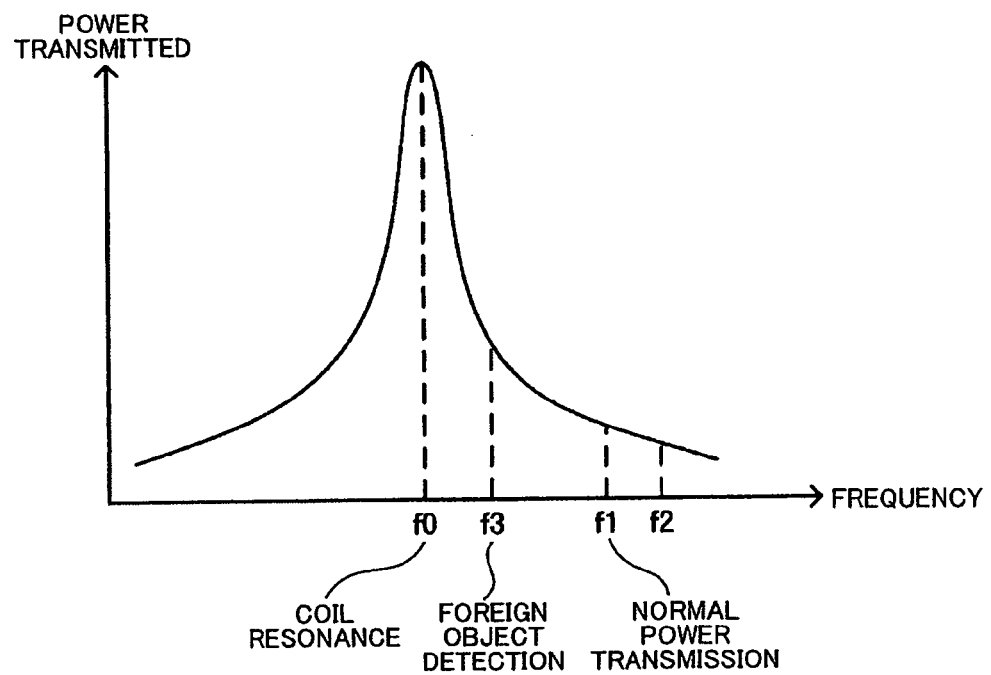

FIG. 9A LOW LOAD
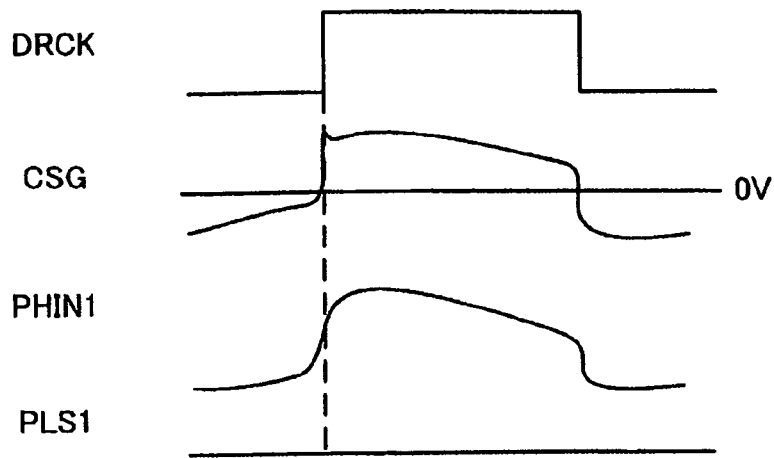
FIG. 9B MEDIUM LOAD
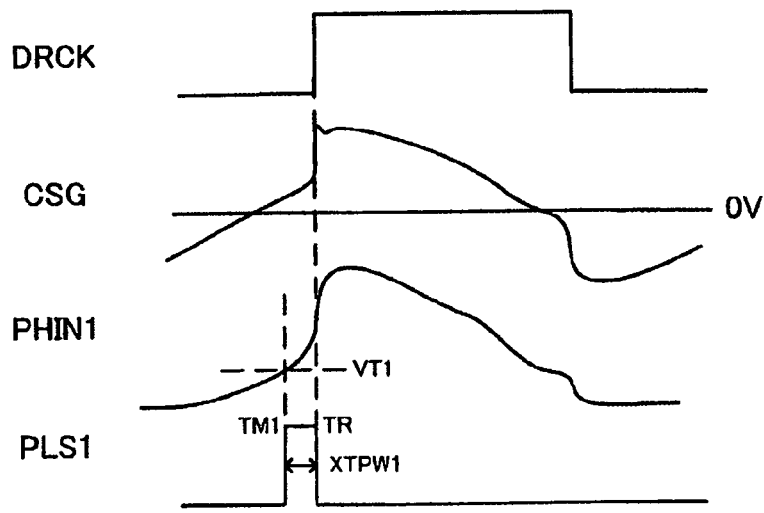
FIG. 9C HIGH LOAD
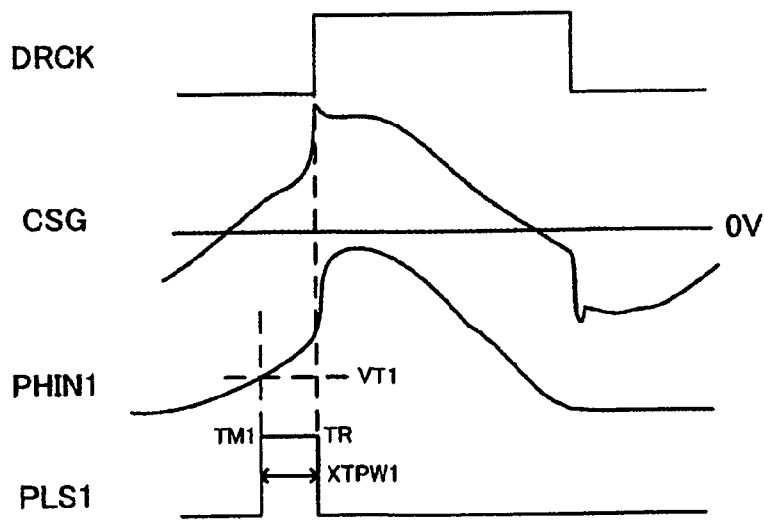

FIG. 10A   NO LOAD
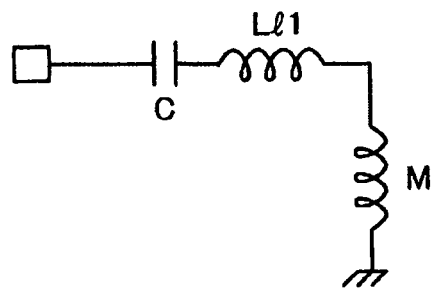
FIG. 10B   LOAD-CONNECTED
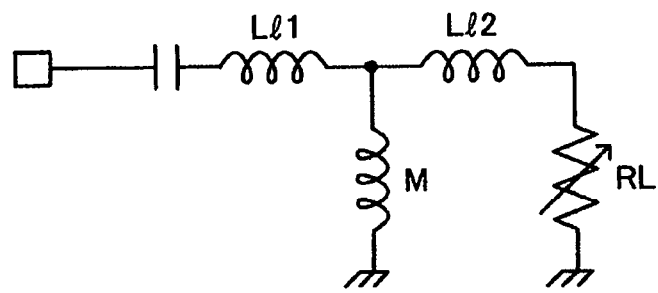
FIG. 10C
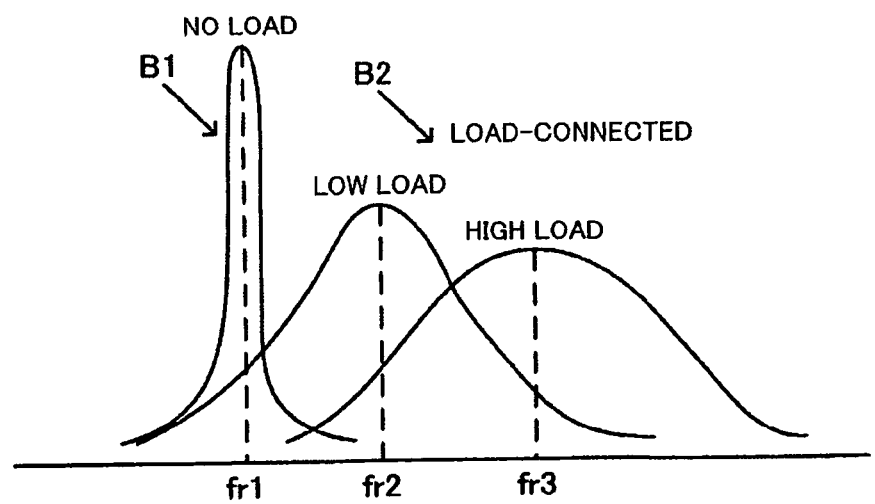

FIG. 14A LOW LOAD
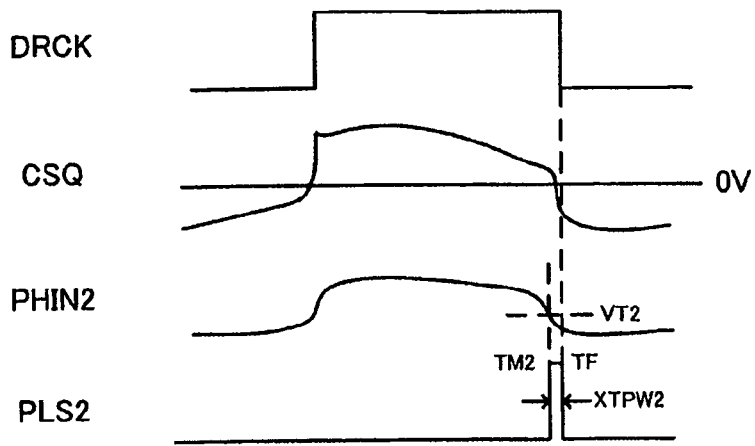
FIG. 14B MEDIUM LOAD
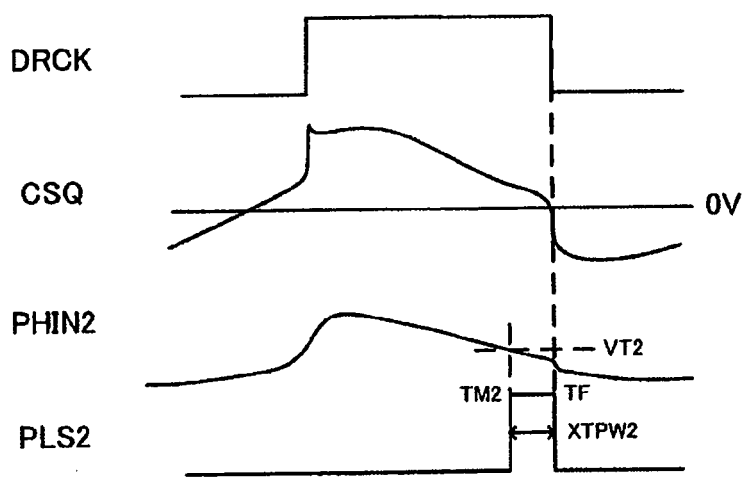
FIG. 14C HIGH LOAD
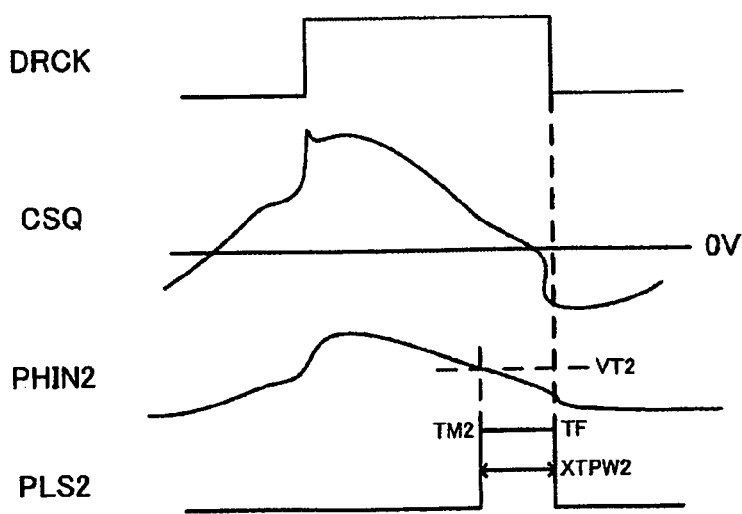

FIG. 18A FIRST LOAD STATE DETECTION CIRCUIT (PWQ1)
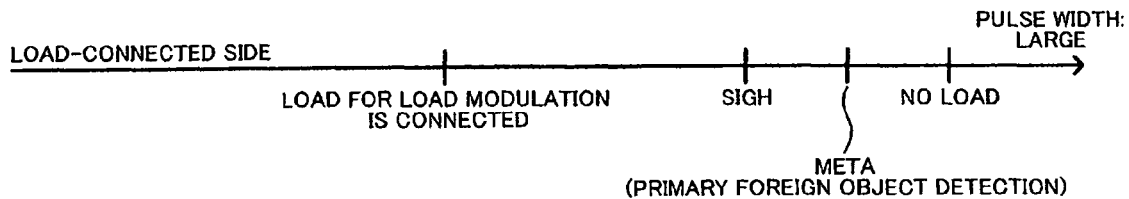
FIG. 18B SECOND LOAD STATE DETECTION CIRCUIT (PWQ2)
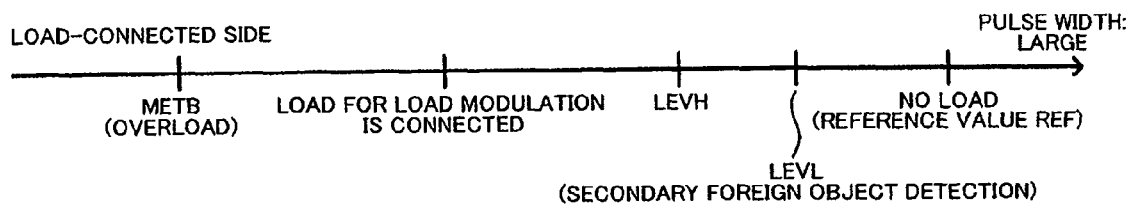
FIG. 19A
| LEVL | REF – N1 |
|---|---|
| LEVH | REF – N2 (N2 > N1) |
FIG. 19B
| SIGH | REFB – N3 |
|---|---|

POWER TRANSMISSION CONTROL DEVICE, POWER TRANSMITTING DEVICE, ELECTRONIC INSTRUMENT, AND NON-CONTACT POWER TRANSMISSION SYSTEM

Japanese Patent Application No. 2007-303008 filed on Nov. 22, 2007, is hereby incorporated by reference in its entirety.

BACKGROUND

The present invention relates to a power transmission control device, a power transmitting device, an electronic instrument, a non-contact power transmission system, and the like.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., cordless telephone handset), and the like have been proposed.

JP-A-2006-60909 discloses related-art non-contact power transmission. According to the technology disclosed in JP-A-2006-60909, data is transmitted from a power receiving device (secondary-side instrument) to a power transmitting device (primary-side instrument) by means of load modulation. The power transmitting device detects the induced voltage of the primary coil using a comparator or the like to detect a change in power-receiving-side (secondary-side) load state due to insertion of a foreign object or data transmission.

According to the technology disclosed in JP-A-2006-60909, the power-receiving-side load state is detected by comparing the peak voltage of the induced voltage with a given threshold voltage. However, the threshold voltage used to determine the detected voltage varies due to a change in power supply voltage, a change in the distance/positional relationship between the primary coil and the secondary coil, a change in element constant (e.g., coil inductance), or the like. This makes it difficult to correctly detect the power-receiving-side load state.

SUMMARY

According to one aspect of the invention, there is provided a power transmission control device that controls power transmission of a power transmitting device of a non-contact power transmission system, the non-contact power transmission system transmitting power from the power transmitting device to a power receiving device by electromagnetically coupling a primary coil and a secondary coil, and supplying the power to a load of the power receiving device, the power transmission control device comprising:

a driver control circuit that controls a power transmitting driver that drives the primary coil;

a load state detection circuit that detects a power-receiving-side load state; and a control circuit that controls the power transmission control device, the control circuit acquiring a reference value in a reference value acquisition period, the reference value being used to determine the power-receiving-side load state after starting normal power transmission, the reference value acquisition period being a period after receiving ID authentication information from the power receiving device, but before starting the normal power transmission.

According to another aspect of the invention, there is provided a power transmitting device comprising:

the above power transmission control device; and a power transmitting section that generates an alternating-current voltage and supplies the alternating-current voltage to the primary coil.

According to another aspect of the invention, there is provided an electronic instrument comprising the above power transmitting device.

According to another aspect of the invention, there is provided a non-contact power transmission system comprising a power transmitting device and a power receiving device, the non-contact power transmission system transmitting power from the power transmitting device to the power receiving device by electromagnetically coupling a primary coil and a secondary coil, and supplying the power to a load of the power receiving device, the power receiving device including:

a power receiving section that converts an induced voltage of the secondary coil into a direct-current voltage; and a load modulation section that variably changes a load corresponding to transmission data when the power receiving device transmits data to the power transmitting device; and the power transmitting device including:

a driver control circuit that controls a power transmitting driver that drives the primary coil;

a load state detection circuit that detects a power-receiving-side load state; and a control circuit that controls the power transmission control device, the control circuit acquiring a reference value in a reference value acquisition period, the reference value being used to determine the power-receiving-side load state after starting normal power transmission, the reference value acquisition period being a period after receiving ID authentication information from the power receiving device, but before starting the normal power transmission.

BRIEF DESCRIPTION OF THE DRAWINGS

FIGS. 7A to 7C are views illustrative of a frequency setting method according to one embodiment of the invention.

FIGS. 9A to 9C show signal waveform measurement results illustrative of a first pulse width detection method.

FIGS. 10A to 10C show equivalent circuits and a resonance characteristic diagram in a no-load state and a load-connected state.

FIGS. 14A to 14C show signal waveform measurement results illustrative of a second pulse width detection method.

FIGS. 18A and 18B show threshold value setting examples.

FIGS. 19A and 19B show examples of a threshold value table.

DESCRIPTION OF EXEMPLARY EMBODIMENTS

Figure 1A:
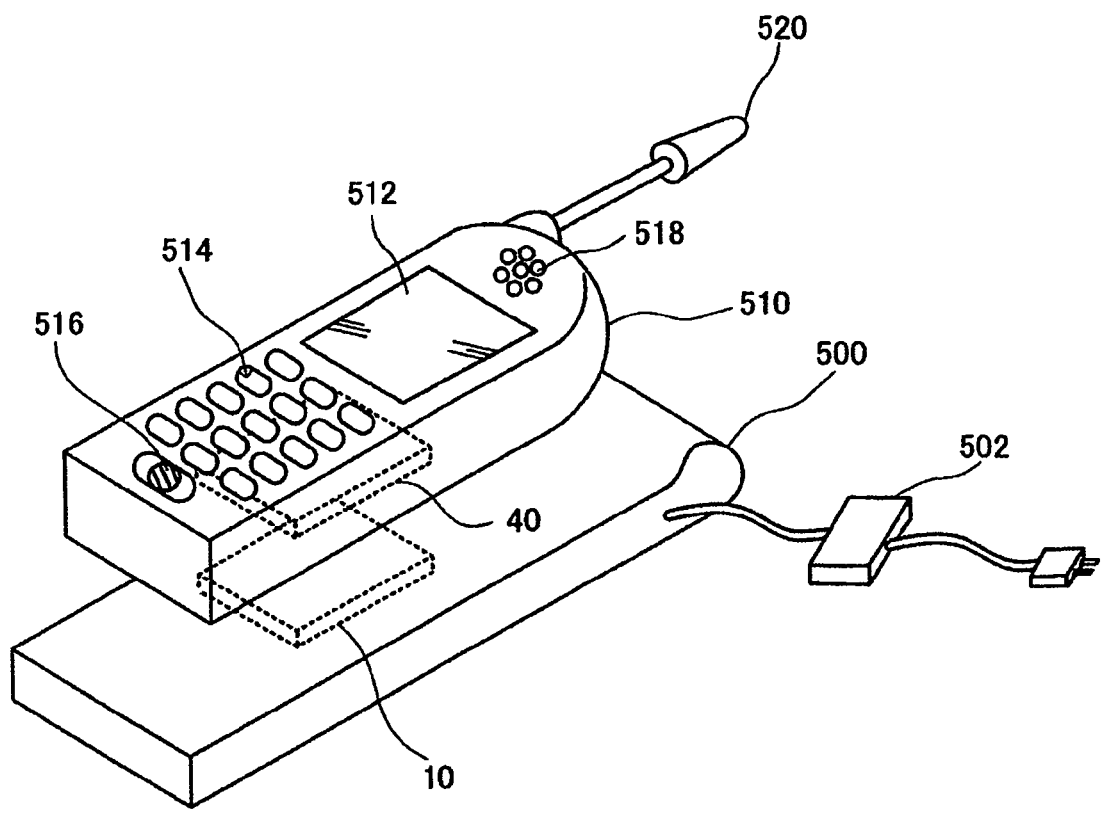
FIGS. 1A and 1B are views illustrative of non-contact power transmission.

Several aspects of the invention may provide a power transmission control device, a power transmitting device, an electronic instrument, and a non-contact power transmission system capable of correctly detecting the power-receiving-side load state.

According to one embodiment of the invention, there is provided a power transmission control device that controls power transmission of a power transmitting device of a non-contact power transmission system, the non-contact power transmission system transmitting power from the power transmitting device to a power receiving device by electromagnetically coupling a primary coil and a secondary coil, and supplying the power to a load of the power receiving device, the power transmission control device comprising:

a driver control circuit that controls a power transmitting driver that drives the primary coil;

a load state detection circuit that detects a power-receiving-side load state; and a control circuit that controls the power transmission control device, the control circuit acquiring a reference value in a reference value acquisition period, the reference value being used to determine the power-receiving-side load state after starting normal power transmission, the reference value acquisition period being a period after receiving ID authentication information from the power receiving device, but before starting the normal power transmission.

According to this embodiment, the power transmitting driver drives the primary coil under control of the driver control circuit, and the load state detection circuit detects the power-receiving-side load state. According to this embodiment, the reference value is acquired before starting normal power transmission after receiving the ID (identification) authentication information from the power receiving device. This makes it possible to implement various determination processes based on the acquired reference value so that the power-receiving-side load state and the like can be detected correctly. Since the reference value can be acquired after checking that the power-receiving-side instrument is a correct instrument by performing the ID authentication process, a situation in which an incorrect reference value is acquired can be prevented.

In the power transmission control device, the control circuit may acquire the reference value in a period in which the power receiving device does not supply power to the load.

The load state detection information that is not affected by the power-receiving-side load state and is acquired in a stable no-load state can be set as the reference value by acquiring the reference value in the above-mentioned period.

In the power transmission control device, the control circuit may transmit permission information to the power receiving device before performing the normal power transmission after the reference value acquisition period, the permission information corresponding to the ID authentication information from the power receiving device.

Since the reference value is acquired before transmitting the permission information, the reference value can be reliably acquired when the power-receiving-side instrument is set in a no-load state.

In the power transmission control device, the control circuit may set a drive frequency of the power transmitting driver at a normal power transmission frequency in the reference value acquisition period.

According to this configuration, since the detection process is performed in the normal power transmission period utilizing the threshold value set using the reference value acquired at the same frequency as the drive frequency used in the normal power transmission period, the detection accuracy can be improved.

In the power transmission control device, the control circuit may calculate a foreign object detection threshold value based on the reference value, and may perform a foreign object detection process after starting the normal power transmission based on the foreign object detection threshold value.

According to this configuration, since a foreign object detection threshold value adapted to a change in power supply voltage or a change in the positional relationship between the coils can be obtained, the foreign object detection capability can be improved.

In the power transmission control device, the control circuit may calculate a data detection threshold value based on the reference value, and may detect data transmitted from the power receiving device after starting the normal power transmission based on the data detection threshold value.

According to this configuration, since a data detection threshold value adapted to a change in power supply voltage or a change in the positional relationship between the coils can be obtained, the data detection capability can be improved.

In the power transmission control device, the power receiving device may include a load modulation section that variably changes a power-receiving-side load;

the control circuit may acquire a first reference value when the load modulation section has set the power-receiving-side load in a first load state in the reference value acquisition period, and may acquire a second reference value when the load modulation section has set the power-receiving-side load in a second load state in the reference value acquisition period; and the control circuit may determine the power-receiving-side load state after to starting the normal power transmission using a threshold value set based on the first reference value and the second reference value.

This enables a determination process taking into account a change in the load state detection information due to a change in the power-receiving-side load state so that the detection accuracy of the determination process can be improved.

In the power transmission control device,
the load state detection circuit may include a pulse width detection circuit that detects pulse width information relating to an induced voltage signal of the primary coil; and
the control circuit may acquire a reference value relating to the pulse width information in the reference value acquisition period.

According to this configuration, a stable detection process can be implemented by a simple configuration without employing a method that individually detects a voltage and a current and makes a determination based on the phase difference.

In the power transmission control device may further comprise:
a drive clock signal generation circuit that generates and outputs a drive clock signal that specifies a drive frequency of the primary coil,
the load state detection circuit may include a first pulse width detection circuit that measures a first pulse width period and detects first pulse width information, the first pulse width period being a period between a first edge timing of the drive clock signal and a first timing, the first timing being a timing when a first induced voltage signal of the primary coil that has changed from a low-potential power supply side exceeds a first threshold voltage.

According to this embodiment, the first pulse width period (i.e., the period between the first edge timing (e.g., falling or rising edge timing) of the drive clock signal and the first timing) is measured and detected as the first pulse width information. The detection process is performed based on the detected first pulse width information. Therefore, a stable detection process can be implemented without employing a method that individually detects a voltage and a current and makes a determination based on the phase difference. According to this embodiment, since the first timing is set at a timing when the first induced voltage signal that has changed from the low-potential-side power supply voltage exceeds the first threshold voltage, the pulse width can be detected with a small variation even if the power supply voltage or the like has changed.

In the power transmission control device,
the load state detection circuit may include a first waveform adjusting circuit that adjusts a waveform of the first induced voltage signal and outputs a first waveform-adjusted signal; and
the first pulse width detection circuit may measure the first pulse width period based on the first waveform-adjusted signal and the drive clock signal.

This makes it possible to digitally measure the first pulse width period using the drive clock signal and a signal of which the waveform has been adjusted by the first waveform adjusting circuit.

In the power transmission control device,
the first pulse width detection circuit may include a first counter that increments or decrements a count value in the first pulse width period, and measures the first pulse width period based on the resulting count value.

This makes it possible to more accurately measure the first pulse width period digitally using the first counter.

In the power transmission control device,
the first pulse width detection circuit may include a first enable signal generation circuit that receives the first waveform-adjusted signal and the drive clock signal, and generates a first enable signal that becomes active in the first pulse width period; and the first counter may increment or decrement the count value when the first enable signal is active.

According to this configuration, since the count process that counts the pulse width period can be controlled merely by generating the first enable signal, the process can be simplified.

In the power transmission control device,
the load state detection circuit may include a second pulse width detection circuit that measures a second pulse width period and detects second pulse width information, the second pulse width period being a period between a second edge timing of the drive clock signal and a second timing, the second timing being a timing when a second induced voltage signal of the primary coil that has changed from a high-potential-side power supply has exceeded a second threshold voltage; and
the control circuit may acquire a reference value for at least one of the first pulse width information and the second pulse width information in the reference value acquisition period.

According to this configuration, the pulse width can be detected using the first and second induced voltage signals that differ in signal state between a first method that utilizes the first pulse width detection circuit and a second method that utilizes the second pulse width detection circuit. As a result, the pulse width detection accuracy and stability can be improved.

According to another embodiment of the invention, there is provided a power transmitting device comprising:
one of the above the power transmission control devices; and
a power transmitting section that generates an alternating-current voltage and supplies the alternating-current voltage to the primary coil.

According to another embodiment of the invention, there is provided an electronic instrument comprising the above power transmitting device.

According to another embodiment of the invention, there is provided a non-contact power transmission system comprising a power transmitting device and a power receiving device, the non-contact power transmission system transmitting power from the power transmitting device to the power receiving device by electromagnetically coupling a primary coil and a secondary coil, and supplying the power to a load of the power receiving device,
the power receiving device including:
a power receiving section that converts an induced voltage of the secondary coil into a direct-current voltage; and
a load modulation section that variably changes a load corresponding to transmission data when the power receiving device transmits data to the power transmitting device; and
the power transmitting device including:
a driver control circuit that controls a power transmitting driver that drives the primary coil;
a load state detection circuit that detects a power-receiving-side load state; and
a control circuit that controls the power transmission control device,
the control circuit acquiring a reference value in a reference value acquisition period, the reference value being used to determine the power-receiving-side load state after starting normal power transmission, the reference value acquisition period being a period after receiving ID authentication information from the power receiving device, but before starting the normal power transmission.

Preferred embodiments of the invention are described in detail below. Note that the following embodiments do not in any way limit the scope of the invention defined by the claims laid out herein. Note that all elements of the following embodiments should not necessarily be taken as essential requirements for the invention.

1. Electronic instrument

FIG. 1A shows examples of an electronic instrument to which a non-contact power transmission method according to one embodiment of the invention is applied. A charger 500 (cradle) (i.e., electronic instrument) includes a power transmitting device 10. A portable telephone 510 (i.e., electronic instrument) includes a power receiving device 40. The portable telephone 510 also includes a display section 512 (e.g., LCD), an operation section 514 that includes buttons or the like, a microphone 516 (sound input section), a speaker 518 (sound output section), and an antenna 520.

Power is supplied to the charger 500 through an AC adaptor 502. The power supplied to the charger 500 is transmitted from the power transmitting device 10 to the power receiving device 40 by means of non-contact power transmission. This makes it possible to charge a battery of the portable telephone 510, or operate a device provided in the portable telephone 510.

Note that the electronic instrument to which this embodiment is applied is not limited to the portable telephone 510. For example, this embodiment may be applied to various electronic instruments such as a wristwatch, a cordless telephone, a shaver, an electric toothbrush, a wrist computer, a handy terminal, a portable information terminal, a power-assisted bicycle, and an IC card.

Figure 1B:
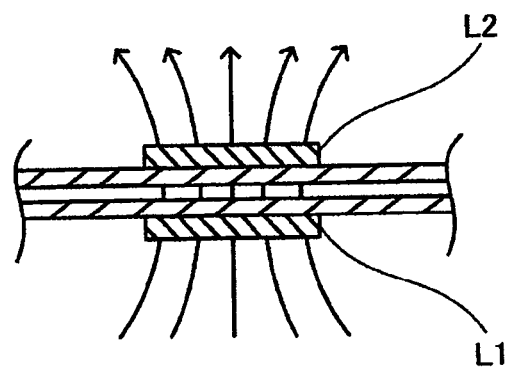

As schematically shown in FIG. 1B, power transmission from the power transmitting device 10 to the power receiving device 40 is implemented by electromagnetically coupling a primary coil L1 (power-transmitting-side coil) provided in the power transmitting device 10 and a secondary coil L2 (power-receiving-side coil) provided in the power receiving device 40 to form a power transmission transformer. This enables non-contact power transmission.

2. Power Transmitting Device and Power Receiving Device

Figure 2:
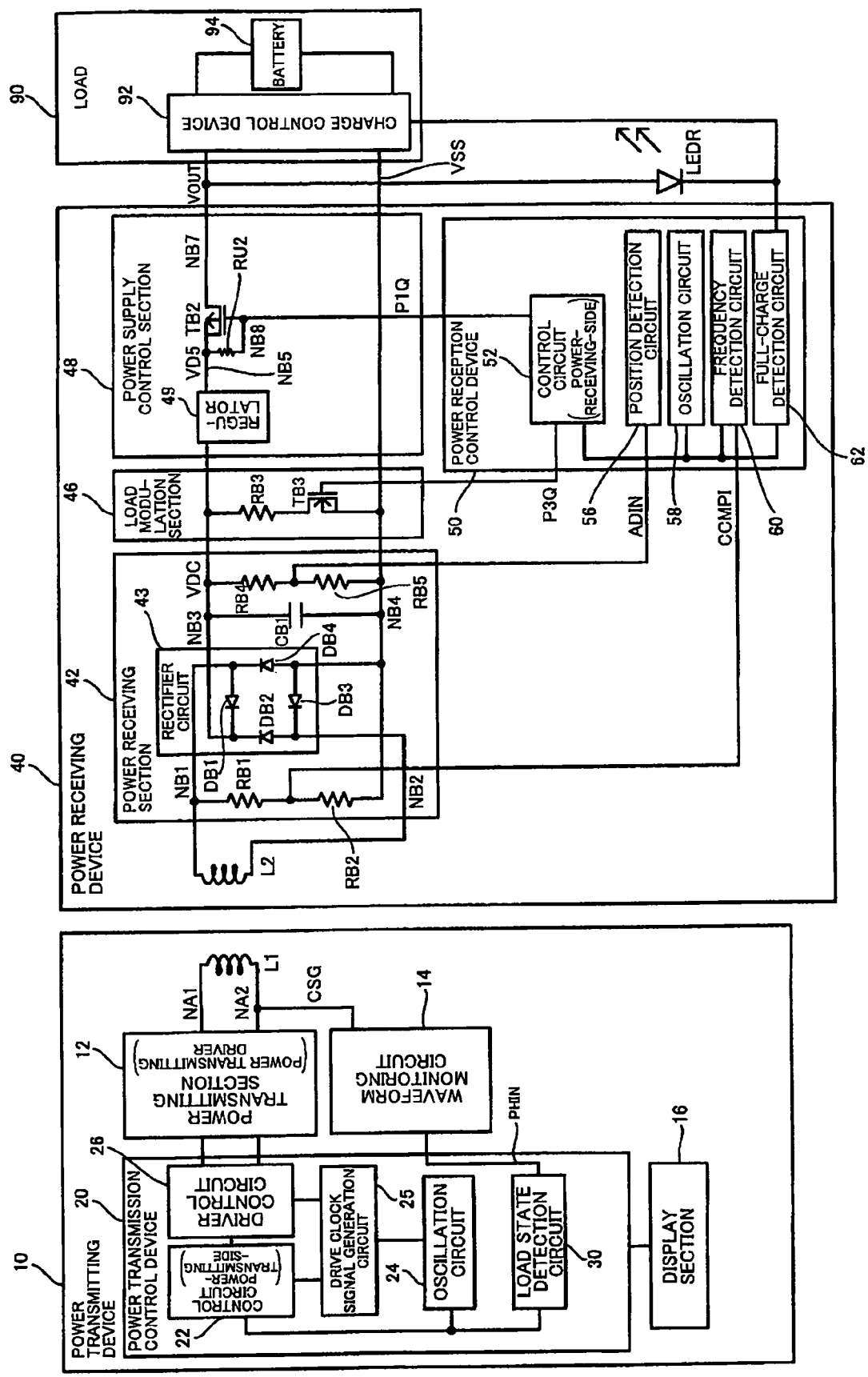
FIG. 2 shows a configuration example of a power transmitting device, a power transmission control device, a power receiving device, and a power reception control device according to one embodiment of the invention.

FIG. 2 shows a configuration example of the power transmitting device 10, a power transmission control device 20, the power receiving device 40, and a power reception control device 50 according to this embodiment. A power-transmitting-side electronic instrument such as the charger 500 shown in FIG. 1A includes the power transmitting device 10 shown in FIG. 2. A power-receiving-side electronic instrument such as the portable telephone 510 may include the power receiving device 40 and a load 90 (actual load). The configuration shown in FIG. 2 implements a non-contact power transmission (contactless power transmission) system that transmits power from the power transmitting device 10 to the power receiving device 40 by electromagnetically coupling the primary coil L1 and the secondary coil L2 (e.g., planar coil), and supplies power (voltage VOUT) to the load 90 from a voltage output node NB7 of the power receiving device 40.

The power transmitting device 10 (power transmitting module or primary module) may include the primary coil L1, a power transmitting section 12, a waveform monitoring circuit 14, a display section 16, and the power transmission control device 20. The power transmitting device 10 and the power transmission control device 20 are not limited to the configuration shown in FIG. 2. Various modifications may be made such as omitting some of the elements (e.g., display section or waveform monitoring circuit), adding other elements, or changing the connection relationship.

Figure 3A:
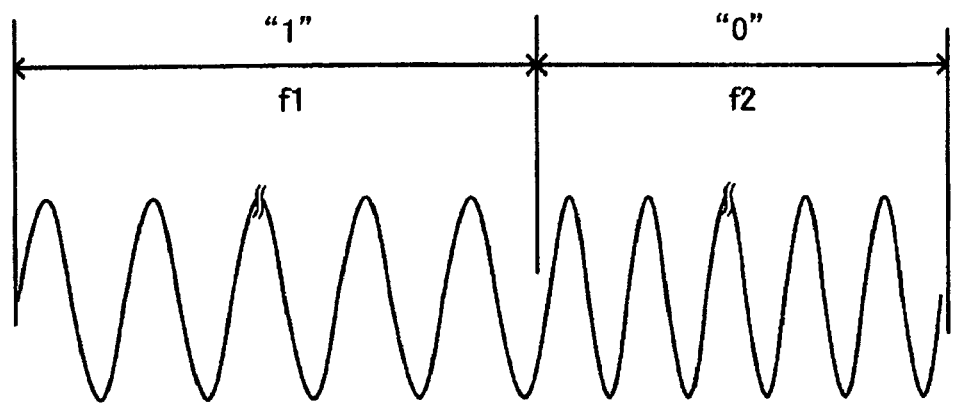
FIGS. 3A and 3B are views illustrative of data transmission by means of frequency modulation and load modulation.

The power transmitting section 12 generates an alternating-current voltage having a given frequency during power transmission, and generates an alternating-current voltage having a frequency that differs depending on data during data transfer. The power transmitting section 12 supplies the generated alternating-current voltage to the primary coil L1. As shown in FIG. 3A, the power transmitting section 12 generates an alternating-current voltage having a frequency f1 when transmitting data "1" to the power receiving device 40, and generates an alternating-current voltage having a frequency f2 when transmitting data "0" to the power receiving device 40, for example. The power transmitting section 12 may include a first power transmitting driver that drives one end of the primary coil L1, a second power transmitting driver that drives the other end of the primary coil L1, and at least one capacitor that forms a resonant circuit together with the primary coil L1.

Each of the first and second power transmitting drivers included in the power transmitting section 12 is an inverter circuit (buffer circuit) that includes a power MOS transistor for example, and is controlled by a driver control circuit 26 of the power transmission control device 20.

The primary coil L1 (power-transmitting-side coil) is electromagnetically coupled to the secondary coil L2 (power-receiving-side coil) to form a power transmission transformer. For example, when power transmission is necessary, the portable telephone 510 is placed on the charger 500 so that a magnetic flux of the primary coil L1 passes through the secondary coil L2, as shown in FIGS. 1A and 1B. When power transmission is unnecessary, the charger 500 and the portable telephone 510 are physically separated so that a magnetic flux of the primary coil L1 does not pass through the secondary coil L2.

The waveform monitoring circuit 14 (rectifier circuit or waveform adjusting circuit) generates a waveform-monitoring induced voltage signal PHIN based on a coil end signal CSG of the primary coil L1. For example, the coil end signal CSG (induced voltage signal) of the primary coil L1 may exceed the maximum rated voltage of an IC of the power transmission control device 20, or may be set at a negative voltage. The waveform monitoring circuit 14 receives the coil end signal CSG, generates a waveform-monitoring induced voltage signal PHIN of which the waveform can be detected by a load state detection circuit 30 of the power transmission control device 20, and outputs the induced voltage signal PHIN to a waveform-monitoring terminal of the power transmission control device 20, for example. Specifically, the waveform monitoring circuit 14 performs a limit operation that clamps a voltage so that the maximum rated voltage is not exceeded, or performs half-wave rectification so that a negative voltage is not applied to the power transmission control device 20. The waveform monitoring circuit 14 may include a resistor, a diode, and the like necessary for the limit operation, half-wave rectification, and a current-limiting operation. For example, the waveform monitoring circuit 14 divides the voltage of the coil end signal CSG using a voltage divider circuit formed of a plurality of resistors, or subjects the coil end signal CSG to half-wave rectification using a diode, and outputs the resulting signal to the power transmission control device 20 as the induced voltage signal PHIN.

The display section 16 displays the state (e.g., power transmission or ID authentication) of the non-contact power transmission system using a color, an image, or the like. The display section 16 is implemented by an LED, an LCD, or the like.

The power transmission control device 20 controls the power transmitting device 10. The power transmission control device 20 may be implemented by an integrated circuit device (IC) or the like. The power transmission control device 20 may include a (power-transmitting-side) control circuit 22, an oscillation circuit 24, a drive clock signal generation circuit 25, a driver control circuit 26, and the load state detection circuit 30. Note that modifications may be made such as omitting some (e.g., oscillation circuit or drive clock signal generation circuit) of the elements or adding other elements.

The power-transmitting-side control circuit 22 (control section) controls the power transmitting device 10 and the power transmission control device 20. The control circuit 22 may be implemented by a gate array, a microcomputer, or the like. Specifically, the control circuit 22 controls the driver control circuit 26 and the load state detection circuit 30. The control circuit 22 performs sequence control and a determination process necessary for power transmission, a load state detection process (e.g., a data detection process, a foreign object detection process, and a removal detection process), frequency modulation, and the like.

The oscillation circuit 24 includes a crystal oscillation circuit, for example. The oscillation circuit 24 generates a primary-side clock signal. The drive clock signal generation circuit 25 generates a drive clock signal that specifies a drive frequency.

The driver control circuit 26 controls the power transmitting drivers that drive the primary coil L1. Specifically, the driver control circuit 26 generates a control signal at a desired frequency based on the drive clock signal from the drive clock signal generation circuit 25, a frequency setting signal from the control circuit 22, and the like, and outputs the control signal to the first and second power transmitting drivers of the power transmitting section 12 to control the first and second power transmitting drivers.

The load state detection circuit 30 (waveform detection circuit) detects the load state of the power-receiving-side instrument (power receiving device or foreign object). The load state detection circuit 30 may detect the load state by detecting a change in the waveform of the induced voltage signal PHIN of the primary coil L1. For example, when the load state (load current) of the power-receiving-side instrument (secondary-side instrument) has changed, the waveform of the induced voltage signal PHIN changes. The load state detection circuit 30 detects the change in the waveform of the induced voltage signal PHIN, and outputs the detection result (detection result information) to the control circuit 22.

Specifically, the load state detection circuit 30 adjusts the waveform of the induced voltage signal PHIN, and generates a waveform-adjusted signal. For example, the load state detection circuit 30 generates a square wave (rectangular wave) waveform-adjusted signal that is activated (e.g., H level) when the induced voltage signal PHIN has exceeded a given threshold voltage. The load state detection circuit 30 detects pulse width information (pulse width period) relating to the waveform-adjusted signal based on the waveform-adjusted signal and the drive clock signal. Specifically, the load state detection circuit 30 receives the waveform-adjusted signal and the drive clock signal from the drive clock signal generation circuit 25, and detects the pulse width information relating to the waveform-adjusted signal to detect pulse width information relating to the induced voltage signal PHIN.

The control circuit 22 (power transmission control device) determines the power-receiving-side (secondary-side) load state (change in load or degree of load) based on the detection result of the load state detection circuit 30. For example, the control circuit 22 determines the power-receiving-side load state based on the pulse width information detected by the load state detection circuit 30 (pulse width detection circuit), and performs a data (load) detection process, a foreign object (metal) detection process, a removal (leave) detection process, and the like. Specifically, the pulse width period (i.e., the pulse width information relating to the induced voltage signal) changes corresponding to the power-receiving-side load state. The control circuit 22 can detect a change in the power-receiving-side load based on the pulse width period (i.e., a count value obtained by measuring the pulse width period). Therefore, when a load modulation section 46 of the power receiving device 40 has transmitted data by means of load modulation (see FIG. 3B), the transmitted data can be detected.

In this embodiment, the control circuit 22 (power transmission control device) acquires a reference value (reference level) used to determine the power-receiving-side (secondary-side) load state (change in load) after starting normal power transmission. Specifically, the control circuit 22 acquires the reference value in a reference value acquisition period that is a period after receiving ID authentication information (e.g., ID authentication frame) from the power receiving device 40, but before starting normal power transmission. Specifically, the control circuit 22 acquires the reference value after receiving the ID authentication information (after checking the ID of the power-receiving-side instrument), and then starts normal power transmission. This makes it possible to acquire the reference value in a period in which the power receiving device 40 does not supply power to the load 90 (i.e., a transistor TB2 is turned OFF) so that the reference value in a no-load state can be acquired.

The control circuit 22 may transmit permission information (e.g., permission frame) corresponding to the ID authentication information from the power receiving device 40 to the power receiving device 40 before starting normal power transmission after the reference value acquisition period. The control circuit 22 may perform a foreign object detection process (primary foreign object detection process) on the power-receiving-side instrument before the reference value acquisition period.

For example, the control circuit 22 sets the drive frequency of the power transmitting driver of the power transmitting section 12 at a normal power transmission frequency (e.g., frequency f1) in the reference value acquisition period. This makes it possible to acquire the reference value at the drive frequency used in the normal power transmission period so that a threshold value appropriate for determination in the normal power transmission period can be acquired. When the control circuit 22 performs the foreign object detection process before the reference value acquisition period, the control circuit 22 sets the drive frequency of the power transmitting driver of the power transmitting section 12 at a foreign object detection frequency (e.g., frequency f3) differing from the normal power transmission frequency (e.g., frequency f1) when performing the foreign object detection process. The foreign object detection frequency is a frequency between the normal power transmission frequency and a coil resonance frequency, for example. The control circuit 22 acquires the reference value after returning the drive frequency from the foreign object detection frequency (f3) to the normal power transmission frequency (f1).

The control circuit 22 calculates a threshold value (determination level) used to determine the power-receiving-side load state after starting normal power transmission based on the acquired reference value, for example. Specifically, the control circuit 22 calculates the threshold value using a table to which the reference value is input and from which the determination threshold value is output, or calculates the threshold value based on a given calculation expression. The control circuit 22 determines the power-receiving-side load state after starting normal power transmission (normal power transmission period) based on the calculated threshold value, for example.

Specifically, the control circuit 22 calculates a foreign object detection threshold value based on the reference value. The control circuit 22 performs a foreign object detection process (secondary foreign object detection process) after starting normal power transmission based on the calculated foreign object detection threshold value. Alternatively, the control circuit 22 calculates a data detection threshold value based on the reference value. The control circuit 22 detects data transmitted from the power receiving device 40 (detects a logic level "0" or "1") after starting normal power transmission based on the calculated data detection threshold value. Alternatively, the control circuit 22 may calculate a removal detection threshold value or an overload detection threshold value based on the reference value, and detect removal of the power-receiving-side instrument or an overload state based on the calculated threshold value.

The power receiving device 40 (power receiving module or secondary module) may include the secondary coil L2, a power receiving section 42, the load modulation section 46, a power supply control section 48, and the power reception control device 50. Note that the power receiving device 40 and the power reception control device 50 are not limited to the configuration shown in FIG. 2. Various modifications may be made such as omitting some of the elements, adding other elements, or changing the connection relationship.

The power receiving section 42 converts an alternating-current induced voltage in the secondary coil L2 into a direct-current voltage. A rectifier circuit 43 included in the power receiving section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power receiving section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power receiving section 42 are provided between the node NB3 (direct-current voltage VDC) and the node NB4 (VSS). A signal ADIN obtained by dividing the voltage between the nodes NB3 and NB4 using the resistors RB4 and RB5 is input to a position detection circuit 56 of the power reception control device 50.

Figure 3B:
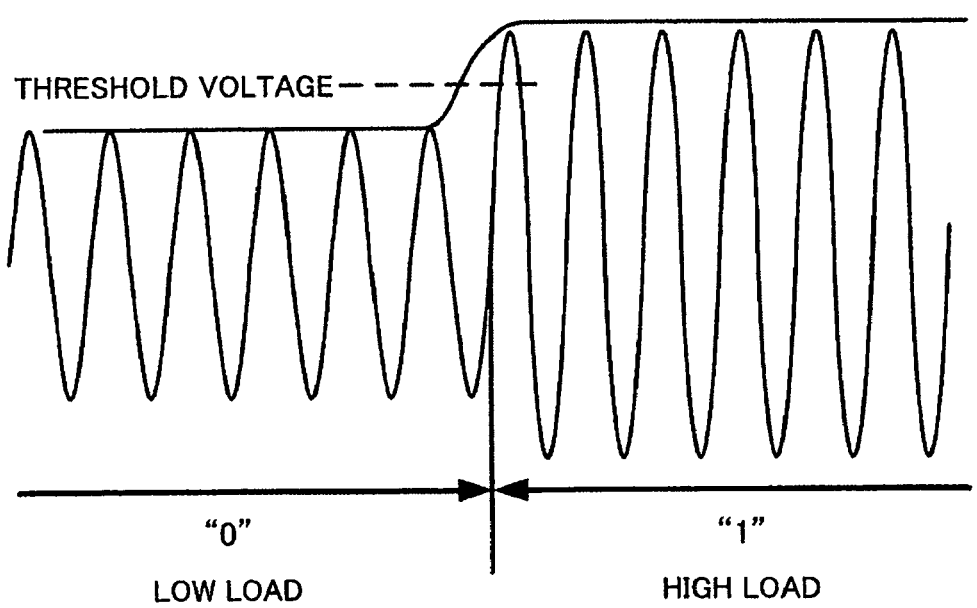

The load modulation section 46 performs a load modulation process. Specifically, when the power receiving device 40 transmits desired data to the power transmitting device 10, the load modulation section 46 variably changes the load of the load modulation section 46 (secondary-side instrument) corresponding to transmission data to change the signal waveform of the induced voltage in the primary coil L1 as shown in FIG. 3B. The load modulation section 46 includes a resistor RB3 and a transistor TB3 (N-type CMOS transistor) provided in series between the nodes NB3 and NB4. The transistor TB3 is ON/OFF-controlled based on a signal P3Q from a control circuit 52 of the power reception control device 50. When the load modulation section 46 performs load modulation by ON/OFF-controlling the transistor TB3, a transistor TB2 of the power supply control section 48 is turned OFF so that the load 90 is electrically disconnected from the power receiving device 40.

For example, when reducing the secondary-side load (high impedance) in order to transmit data "0" (see FIG. 3B), the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 is equivalent to the resistor RB3 (high load).

The power supply control section 48 controls the amount of power supplied to the load 90. A regulator 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

The transistor TB2 (P-type CMOS transistor) is controlled based on a signal P1Q from the control circuit 52 of the power reception control device 50. Specifically, the transistor TB2 is turned ON when normal power transmission is performed after ID authentication has been completed (established), and is turned OFF during load modulation or the like.

The power reception control device 50 controls the power receiving device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-receiving-side) control circuit 52, the position detection circuit 56, an oscillation circuit 58, the frequency detection circuit 60, and a full-charge detection circuit 62.

The control circuit 52 (control section) controls the power receiving device 40 and the power reception control device 50. The control circuit 52 may be implemented by a gate array, a microcomputer, or the like. Specifically, the control circuit 22 performs sequence control and a determination process necessary for ID authentication, position detection, frequency detection, load modulation, full-charge detection, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is correct. Specifically, the position detection circuit 56 converts the signal ADIN into a binary value using a comparator or determines the level of the signal ADIN by A/D conversion, and determines whether or not the positional relationship between the primary coil L1 and the secondary coil L2 is correct.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmitting device 10 is "1" or "0", as shown in FIG. 3A.

The full-charge detection circuit 62 (charge detection circuit) is a circuit that detects whether or not a battery 94 (secondary battery) of the load 90 has been fully charged (charged).

The load 90 may include a charge control device 92 that controls charging of the battery 94 and the like. The charge control device 92 (charge control IC) may be implemented by an integrated circuit device or the like. The battery 94 may be provided with the function of the charge control device 92 (e.g., smart battery).

3. Operation

Figure 4:
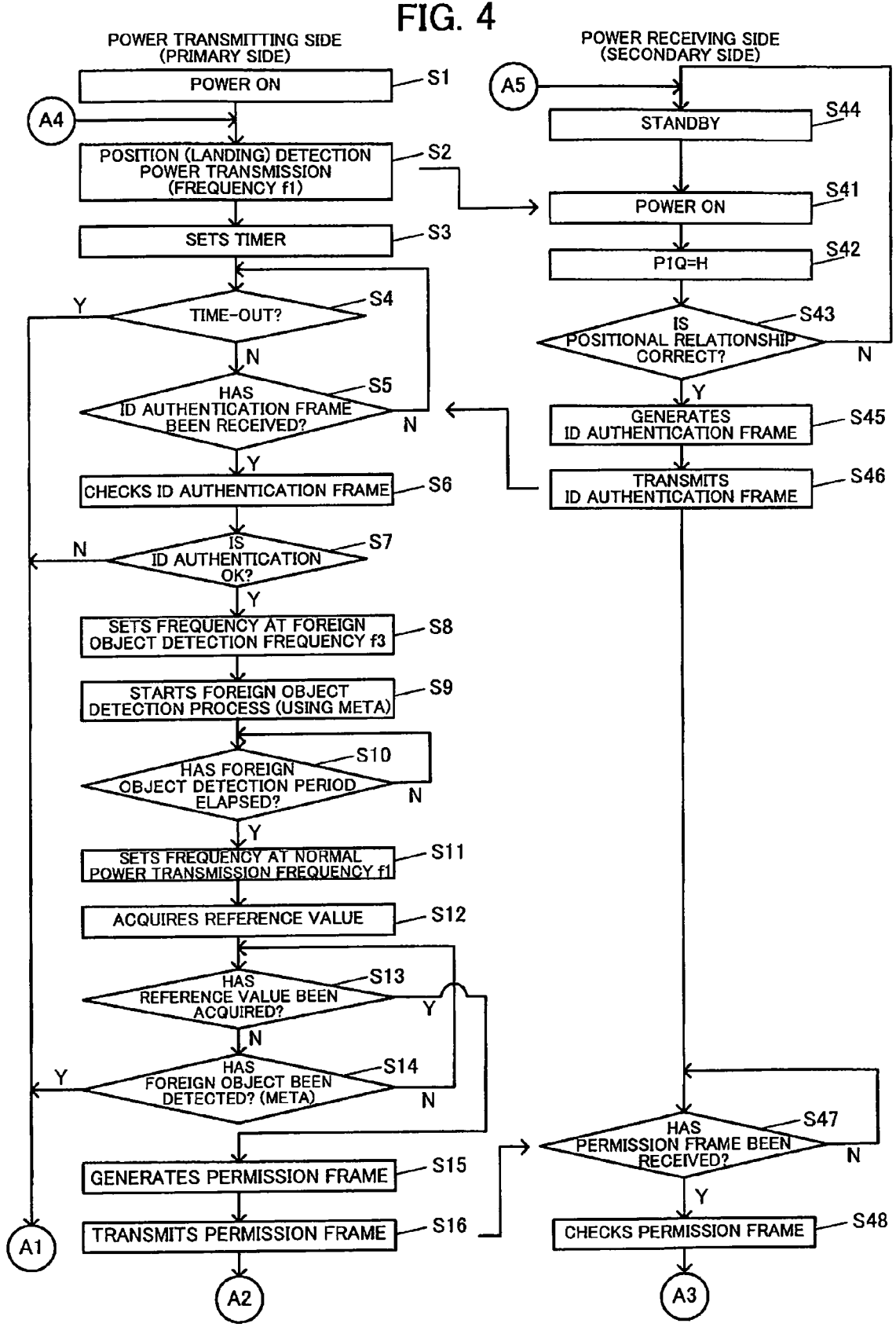
FIG. 4 is a flowchart illustrative of the operation according to one embodiment of the invention.

An example of the power-transmitting-side operation and the power-receiving-side operation is described below using flowcharts shown in FIGS. 4 and 5. When power has been supplied to the power-transmitting-side instrument (step S1), the power-transmitting-side instrument performs position-detection (landing-detection) temporary power transmission (step S2). Specifically, the power-transmitting-side instrument performs power transmission for the power-receiving-side instrument to detect whether or not the portable telephone 510 shown in FIG. 1A has been placed at a correct position of the charger 500. The drive frequency (i.e., the frequency of the drive clock signal from the drive clock signal generation circuit) during position-detection power transmission is set at the frequency f1, for example.

The power-receiving-side power supply voltage rises due to position-detection power transmission (temporary power transmission) from the power-transmitting-side instrument (step S41) so that the reset state of the power reception control device 50 is canceled. The power-receiving-side instrument (power reception control device) then sets the signal P1Q shown in FIG. 2 at the H level (step S42). This causes the transistor TB2 of the power supply control section 48 shown in FIG. 2 to be turned OFF so that the load 90 is electrically disconnected from the power receiving device 40.

The power-receiving-side instrument then determines whether or not the positional relationship (position level) between the primary coil L1 and the secondary coil L2 is correct using the position detection circuit 56 (step S43). When the power-receiving-side instrument has determined that the positional relationship between the primary coil L1 and the secondary coil L2 is incorrect, the power-receiving-side instrument stops operation (step S44). Specifically, the power-receiving-side instrument sets a wait period using a timer, and stops operation during the wait period.

When the power-receiving-side instrument has determined that the positional relationship between the primary coil L1 and the secondary coil L2 is correct, the power-receiving-side instrument performs an ID authentication process, and generates an ID authentication frame (ID authentication information in a broad sense) (step S45). The ID authentication frame includes an ID code for identifying the power receiving device 40. Specifically, the ID authentication frame may include a start code, a command ID, position level data (i.e., output data from the position detection circuit 56), an error code, and the like. The power-receiving-side instrument transmits the generated ID authentication frame to the power-transmitting-side instrument (step S46). Specifically, the power-receiving-side instrument transmits data relating to the ID authentication frame by means of load modulation described with reference to FIG. 3B.

The power-transmitting-side instrument starts position-detection power transmission, sets a wait period using a timer, and stands by during the wait period (step S3). When the set wait period has elapsed (time-out), the power-transmitting-side instrument stops power transmission (i.e., stops driving the power transmitting drivers) (steps S4 and S32).

When the power-transmitting-side instrument has received the ID authentication frame during the wait period, the power-transmitting-side instrument checks the received ID authentication frame (steps S5 and S6). Specifically, the power-transmitting-side instrument determines whether or not the ID code included in the ID authentication frame is correct (i.e., whether or not the power receiving device is correct). The power-transmitting-side instrument also checks the start code, the command ID, the position level data, and the error code. When ID authentication has failed (e.g., the ID of the power-receiving-side instrument is incorrect), the power-transmitting-side instrument stops power transmission (steps S7 and S32).

When ID authentication has succeeded, the power-transmitting-side instrument sets the drive frequency at the foreign object detection frequency f3 (step S8). The power-transmitting-side instrument then starts the foreign object detection process (primary foreign object detection process) before starting normal power transmission (step S9). Specifically, the power-transmitting-side instrument activates a foreign object detection enable signal to instruct the load state detection circuit 30 to start the foreign object detection process, for example. The foreign object detection process may be implemented by comparing the load state detection information (e.g., pulse width information) from the load state detection circuit 30 with the load state detection first threshold value (META), for example. The power-transmitting-side instrument sets the drive frequency at the normal power transmission frequency f1 when the foreign object detection period has elapsed (steps S10 and S11). Specifically, the power-transmitting-side instrument returns the drive frequency that has been set at the foreign object detection frequency f3 in the step S8 to the normal power transmission frequency f1.

The power-transmitting-side instrument then acquires the reference value used to determine the power-receiving-side load state (step S12). The reference value is a reference value for pulse width detection information described later, for example.

The power-transmitting-side instrument then determines whether or not the reference value has been acquired (whether or not the reference value acquisition period has elapsed) (step S13). When the reference value has not been acquired, the power-transmitting-side instrument performs the foreign object detection process. When the power-transmitting-side instrument has detected a foreign object, the power-transmitting-side instrument stops power transmission (steps S14 and S32). A situation in which a foreign object is inserted in the reference value acquisition period so that an incorrect reference value is acquired can be effectively prevented by performing the foreign object detection process in the reference value acquisition period.

After the power-transmitting-side instrument has acquired the reference value, the power-transmitting-side instrument then generates the permission frame (permission information in a broad sense) corresponding to the ID authentication frame (step S15). The permission frame includes a permission code that indicates that ID authentication requested from the power-receiving-side instrument has succeeded. The permission frame may also include a start code, an error code, a finish code, and the like. The power-transmitting-side instrument transmits the generated permission frame to the power-receiving-side instrument (step S16). Specifically, the power-transmitting-side instrument transmits data relating to the permission frame by means of frequency modulation described with reference to FIG. 3A.

When the power-receiving-side instrument has received the permission frame, the power-receiving-side instrument checks the permission frame (steps S47 and S48). Specifically, the power-receiving-side instrument checks whether or not the permission code and the like included in the permission frame are correct. When the power-receiving-side instrument has determined that the permission code and the like are correct, the power-receiving-side instrument generates a start frame for starting non-contact power transmission, and transmits the start frame to the power-transmitting-side instrument (steps S51 and S52). The power-receiving-side instrument then sets the signal P1Q at the L level (step S53). This causes the transistor TB2 of the power supply control section 48 shown in FIG. 2 to be turned OFF so that power can be supplied to the load 90.

The power-transmitting-side instrument detects whether or not the power-receiving-side instrument has been removed after starting transmission of the permission frame. When the power-transmitting-side instrument has detected that the power-receiving-side instrument has been removed, the power-transmitting-side instrument stops power transmission (steps S21 and S32). The power-transmitting-side instrument successively detects whether or not the power-receiving-side instrument has been removed until transmission of the permission frame is completed (step S22). When transmission of the permission frame has been completed, the power-transmitting-side instrument determines whether or not the start frame has been received from the power-receiving-side instrument (step S23).

When the power-transmitting-side instrument has received the start frame, the power-transmitting-side instrument checks the start frame (step S24). When the power-receiving-side instrument has determined that the start frame is correct, the power-receiving-side instrument enables a regular load change detection process described later (step S25), and starts normal power transmission (standard power transmission) (step S26).

The power-receiving-side instrument receives power when the power-transmitting-side instrument has started normal power transmission, and supplies power to the load 90 (step S54). This allows the battery 94 to be charged, for example. The power-receiving-side instrument performs a regular load modulation process after the power-transmitting-side instrument has started normal power transmission (step S55). Specifically, the power-receiving-side instrument causes the transistor TB3 of the load modulation section 46 shown in FIG. 2 to be turned ON/OFF in a given pattern during a regular authentication period. The power-receiving-side instrument then determines whether or not the battery 94 has been fully charged. When the power-receiving-side instrument has determined that the battery 94 has been fully charged, the power-receiving-side instrument transmits a full-charge notification frame (save frame) that indicates that the battery 94 has been fully charged (step S57).

The power-transmitting-side instrument performs the removal detection process and the foreign object detection process after starting normal power transmission. When the power-transmitting-side instrument has detected removal of the power-receiving-side instrument or detected a foreign object, the power-transmitting-side instrument stops power transmission (steps S27, S28, and S32). The power-transmitting-side instrument also detects whether or not a takeover state due to a large metal foreign object or the like has occurred during the regular authentication period utilizing the regular load change detection process enabled in the step S25 (step S29). The power-transmitting-side instrument then determines whether or not the full-charge notification frame has been received from the power-receiving-side instrument. When the power-transmitting-side instrument has received the full-charge notification frame from the power-receiving-side instrument, the power-transmitting-side instrument disables the regular load change detection process, and stops power transmission (steps S30, S31, and S32). In this embodiment, the power-transmitting-side instrument performs the removal detection process, the foreign object detection process, the takeover detection (regular authentication) process, the full-charge notification frame data detection process, and the like based on the threshold values set using the reference value acquired in the step S12.

In this embodiment, the power-transmitting-side instrument (control circuit 22) acquires the reference value after receiving the ID authentication frame (ID authentication information) from the power receiving device 40, as indicated by the steps S5 and S12. The power-transmitting-side instrument starts normal power transmission to the power receiving device 40 after acquiring the reference value, as indicated by the step S26. Specifically, the power-transmitting-side instrument acquires the reference value before starting normal power transmission after performing the ID authentication process.

As a comparative example of this embodiment, the power-transmitting-side instrument may perform the foreign object detection process or the data detection process based on a threshold value set without using the reference value. According to this method, the load state detection information (pulse width or count value) used for the foreign object detection process (regular authentication process) or the data detection process varies due to a change in power supply voltage, a change in the positional relationship between the primary coil L1 and the secondary coil L2, or the like. This makes it necessary to weaken the foreign object detection threshold value when performing the foreign object detection process. As a result, the foreign object detection capability deteriorates.

In this embodiment, the power-transmitting-side instrument acquires the reference value during the ID authentication process, and performs the determination process such as the foreign object detection process or the data detection process based on the threshold value set using the acquired reference value. Therefore, since a threshold value adapted to a change in power supply voltage or a change in the positional relationship between the primary coil L1 and the secondary coil L2 can be obtained, the foreign object detection capability and the data detection capability can be improved.

In this embodiment, the power-transmitting-side instrument acquires the reference value before starting normal power transmission. The power-receiving-side instrument is set in a no-load state before the power-transmitting-side instrument starts normal power transmission. Specifically, since the transistor TB2 of the power supply control section 48 is turned OFF, the power-receiving-side load is not observed from the power-transmitting-side instrument. The load state detection information (pulse width or count value) that is not affected by the power-receiving-side load state and is acquired in a stable no-load state can be set as the reference value by acquiring the reference value in the above-mentioned state. This makes it possible to set the threshold value for the foreign object detection process or the data detection process using a differential value with respect to the reference value so that the threshold value can be easily set. As a result, the design can be simplified while further improving the foreign object detection capability and the data detection capability.

In this embodiment, the power-transmitting-side instrument acquires the reference value after checking that the power-receiving-side instrument is a correct instrument by performing the ID authentication process. This effectively prevents a situation in which an incorrect reference value is acquired in a state in which a foreign object is inserted between the power-receiving-side instrument and the power-transmitting-side instrument.

In this embodiment, the power-transmitting-side instrument transmits the permission information (permission frame) corresponding to the ID authentication information (ID authentication information) from the power-receiving-side instrument to the power-receiving-side instrument before starting normal power transmission after acquiring the reference value, as indicated by the steps S12, S16, and S26. For example, when the power-receiving-side instrument has received the permission frame after transmitting the ID authentication frame, the power-receiving-side instrument transmits the start frame to the power-transmitting-side instrument, as indicated by the steps S46, S47, and S52. The power-receiving-side instrument then sets the signal P1Q at the L level so that the transistor TB2 is turned ON to connect the load 90 to the power-receiving-side instrument, as indicated by the step S53.

The power-transmitting-side instrument can acquire the reference value in a period in which the transistor TB2 is turned OFF and power is not supplied to the load 90 by acquiring the reference value before transmitting the permission frame, as indicated by the steps S12 and S16. Therefore, since the reference value can be reliably acquired in a period in which the power-receiving-side instrument is set in a no-load state, the foreign object detection accuracy and the data detection accuracy can be further improved.

In this embodiment, the power-transmitting-side instrument sets the drive frequency of the power transmitting driver at the normal power transmission frequency f1 in the reference value acquisition period, as indicated by the step S11. Therefore, since the foreign object detection process or the data detection process is performed in the normal power transmission period utilizing the threshold value set using the reference value acquired at the same frequency f1 as the drive frequency used in the normal power transmission period, the detection accuracy can be improved.

4. Foreign Object Detection Frequency

Figure 6:
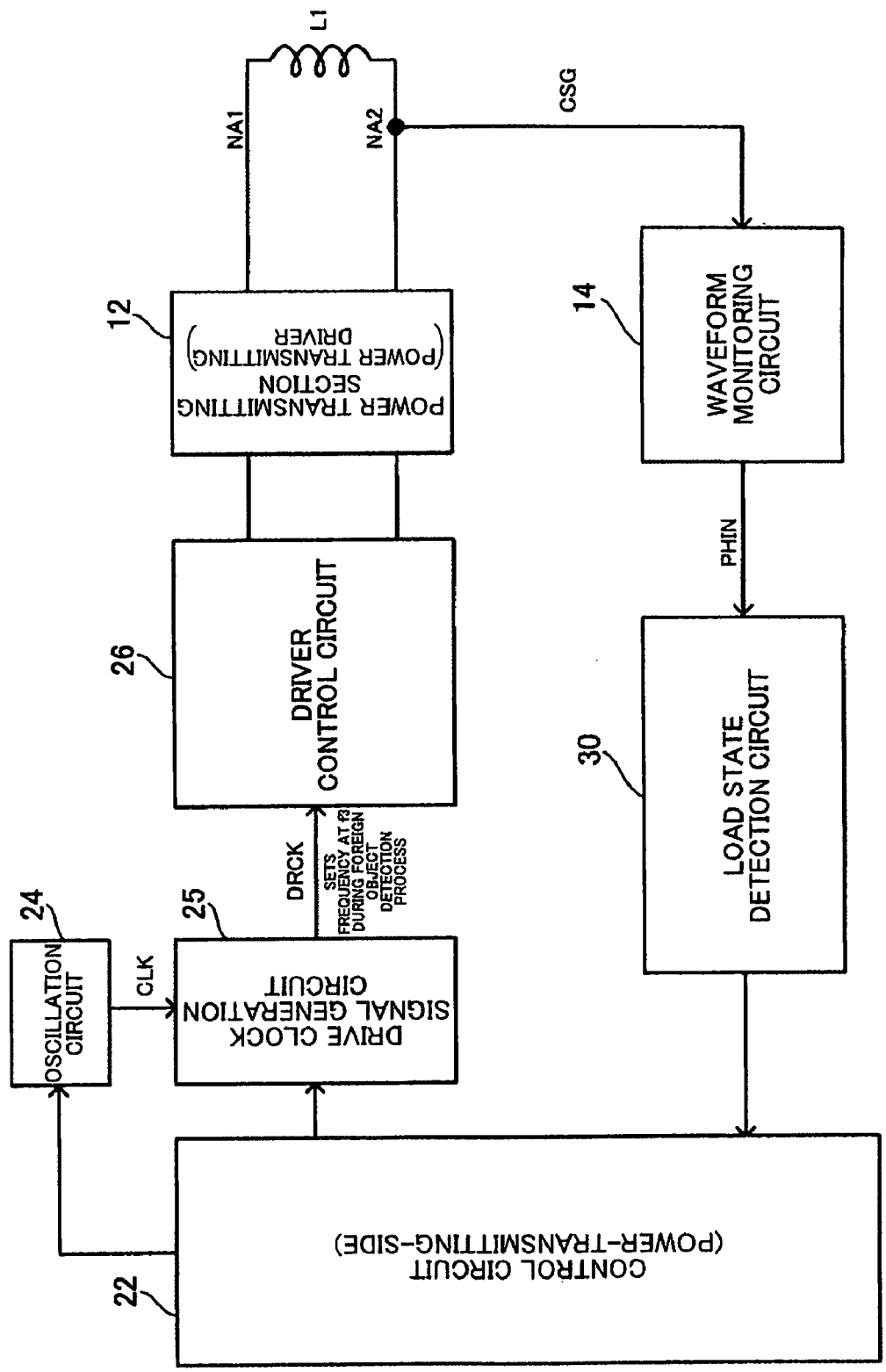
FIG. 6 shows a configuration example of a power transmission control device according to one embodiment of the invention.

FIG. 6 shows a configuration example of the power transmission control device 20 according to this embodiment. Note that the power transmission control device 20 according to this embodiment is not limited to the configuration shown in FIG. 6. Various modifications may be made such as omitting some of the elements (e.g., waveform monitoring circuit) or adding other elements.

In FIG. 6, the drive clock signal generation circuit 25 generates a drive clock signal DRCK that specifies the drive frequency of the primary coil L1. Specifically, the drive clock signal generation circuit 25 generates the drive clock signal DRCK by dividing the frequency of a reference clock signal CLK generated by the oscillation circuit 24. An alternating-current voltage at a drive frequency specified by the drive clock signal DRCK is supplied to the primary coil L1.

The driver control circuit 26 generates a driver control signal based on the drive clock signal DRCK, and outputs the driver control signal to the power transmitting drivers (first and second power transmitting drivers) of the power transmitting section 12 that drives the primary coil L1. In this case, in order to prevent a shoot-through current from flowing through the inverter circuit of the power transmitting driver, the driver control circuit 26 generates the driver control signal so that a signal input to the gate of a P-type transistor of the inverter circuit does not overlap a signal input to the gate of an N-type transistor of the inverter circuit.

The load state detection circuit 30 detects a change in the waveform of the induced voltage signal PHIN of the primary coil L1. The control circuit 22 performs the foreign object detection process based on the detection result of the load state detection circuit 30.

For example, the load state detection circuit 30 detects the pulse width information relating to the induced voltage signal PHIN. The control circuit 22 performs the foreign object detection process based on the detected pulse width information. Specifically, the load state detection circuit 30 detects the pulse width information using a first pulse width detection method described later, and the control circuit 22 performs the foreign object detection process based on the detected pulse width information. For example, the load state detection circuit 30 measures the pulse width period from the edge timing of the drive clock signal to the timing when the induced voltage signal PHIN (coil end signal CSG) exceeds a given threshold voltage.

The load state detection circuit 30 may detect the pulse width information using a second pulse width detection method described later. For example, the load state detection circuit 30 measures the pulse width period from the edge timing of the drive clock signal to the timing when the induced voltage signal PHIN (coil end signal CSG) becomes lower than a given threshold voltage.

The load state detection circuit 30 may detect the pulse width using the first method and the second method. For example, the primary foreign object detection process may be performed using the first method before normal power transmission starts, and the secondary foreign object detection process may be performed using the second method after normal power transmission has started.

A foreign object may be detected by causing the load state detection circuit 30 to determine phase characteristics due to load. For example, a foreign object may be detected by detecting a voltage/current phase difference. Alternatively, a foreign object may be detected by monitoring the peak value of the induced voltage signal PHIN and detecting a change in the peak value.

In this embodiment, the drive clock signal DRCK (including a signal equivalent to the drive clock signal) is set at the foreign object detection frequency f3 differing from the normal power transmission frequency f1 during the foreign object detection process (foreign object detection period or foreign object detection mode). Specifically, the control circuit 22 outputs a drive frequency change instruction signal to the drive clock signal generation circuit 25 during the foreign object detection process (e.g., during the primary foreign object detection process). This causes the drive clock signal generation circuit 25 to generate and output the drive clock signal DRCK set at the foreign object detection frequency f3 during the foreign object detection process. For example, the drive clock signal generation circuit 25 changes the drive frequency from the normal power transmission frequency f1 to the foreign object detection frequency f3 by changing the dividing ratio of the reference clock signal CLK, and outputs the drive clock signal DRCK set at the foreign object detection frequency f3 to the driver control circuit 26. The driver control circuit 26 generates the driver control signal set at the foreign object detection frequency f3 to control the power transmitting drivers. The foreign object detection frequency f3 may be set at a frequency between the normal power transmission frequency f1 and a coil resonance frequency f0, for example.

FIG. 7A shows a signal waveform example of the coil end signal CSG when the power-receiving-side (secondary-side) load is low (i.e., the load current is small), and FIG. 7B shows a signal waveform example of the coil end signal CSG when the power-receiving-side (secondary-side) load is high (i.e., the load current is large). As shown in FIGS. 7A and 7B, the waveform of the coil end signal CSG is distorted as the power-receiving-side load increases.

In the low-load state shown in FIG. 7A, a square wave (drive waveform) (i.e., the waveform of the drive clock signal DRCK) is predominant over a sine wave (coil resonance waveform), as described later. In the high-load state shown in FIG. 7B, a sine wave (resonance waveform) is predominant over a square wave (drive waveform) so that the waveform is distorted.

The first pulse width detection method described later detects a pulse width period XTPW1 when the coil end signal CSG rises (see FIG. 7B) to detect a change in load due to insertion of a foreign object. The second pulse width detection method detects a pulse width period XTPW2 when the coil end signal CSG falls to detect a change in load due to insertion of a foreign object. In FIG. 7B, a change in load due to insertion of a foreign object is detected by detecting that the coil end signal CSG has changed from a signal waveform in which a square wave is predominant to a signal waveform in which a sine wave is predominant.

In this embodiment, the drive frequency is set at the foreign object detection frequency f3 differing from the normal power transmission frequency f1 during the to foreign object detection process, as shown in FIG. 7C. Specifically, the drive frequency is set at the foreign object detection frequency f3 between the normal power transmission frequency f1 and the coil resonance frequency f0 (i.e., the resonance frequency of the resonant circuit formed by the coil and the like).

The waveform of the coil end signal CSG (induced voltage signal) can be distorted to a large extent during the foreign object detection process by changing the drive frequency from the normal power transmission frequency f1 to the foreign object detection frequency f3 that is closer to the coil resonance frequency f0 than the normal power transmission frequency f1.

Specifically, a sine wave (resonance waveform) becomes predominant as the drive frequency approaches the resonance frequency, as described later. Therefore, when the drive frequency is set at the foreign object detection frequency f3 close to the resonance frequency f0, a sine wave becomes predominant as compared with the case of setting the drive frequency at the normal power transmission frequency f1 so that the waveform is distorted to a larger extent. Specifically, the foreign object detection process can be performed in a frequency band where a change in pulse width (phase) easily occurs. This increases the foreign object detection sensitivity so that the foreign object detection accuracy increases. Specifically, since the waveform changes to a large extent due to a small change in load so that the pulse width periods XTPW1 and XTPW2 change to a large extent, a small metal foreign object or the like can be easily detected.

For example, the drive frequency f1 during normal power transmission is set at a frequency away from the resonance frequency f0 from the viewpoint of power transmission efficiency and current consumption, and the frequency f3 close to the resonance frequency f0 is not generally used during normal power transmission.

However, since the transistor TB2 shown in FIG. 2 is turned OFF during the foreign object detection process (primary foreign object detection process) before normal power transmission starts so that power transmission to the load 90 is stopped, the power-receiving-side load is almost zero. Therefore, since the power transmission efficiency and power consumption need not be taken into consideration during the foreign object detection process, the foreign object detection frequency f3 can be set at a frequency close to the resonance frequency f0 without causing a problem. In this embodiment, the drive frequency is set at the frequency f3 between the frequencies f0 and f1 from the above-described point of view.

The first pulse width detection method reduces a variation in pulse width detection due to a change in power supply voltage and the like as compared with the second pulse width detection method, but has low sensitivity to a change in load, as described later. On the other hand, since the amount of distortion of the waveform due to a change in load is increased by setting the foreign object detection frequency f3 at a frequency close to the resonance frequency f0 during the foreign object detection process using the first pulse width detection method, the sensitivity to a change in load can be improved.

Note that various methods such as a phase detection method and a peak voltage detection method may be employed for the load state detection circuit 30 in addition to the pulse width detection method. In this case, the foreign object detection frequency f3 may be set at a frequency appropriate for each method. For example, the foreign object detection frequency f3 may be set at a frequency higher than the normal power transmission frequency f1.

5. First Modification

Figure 8:
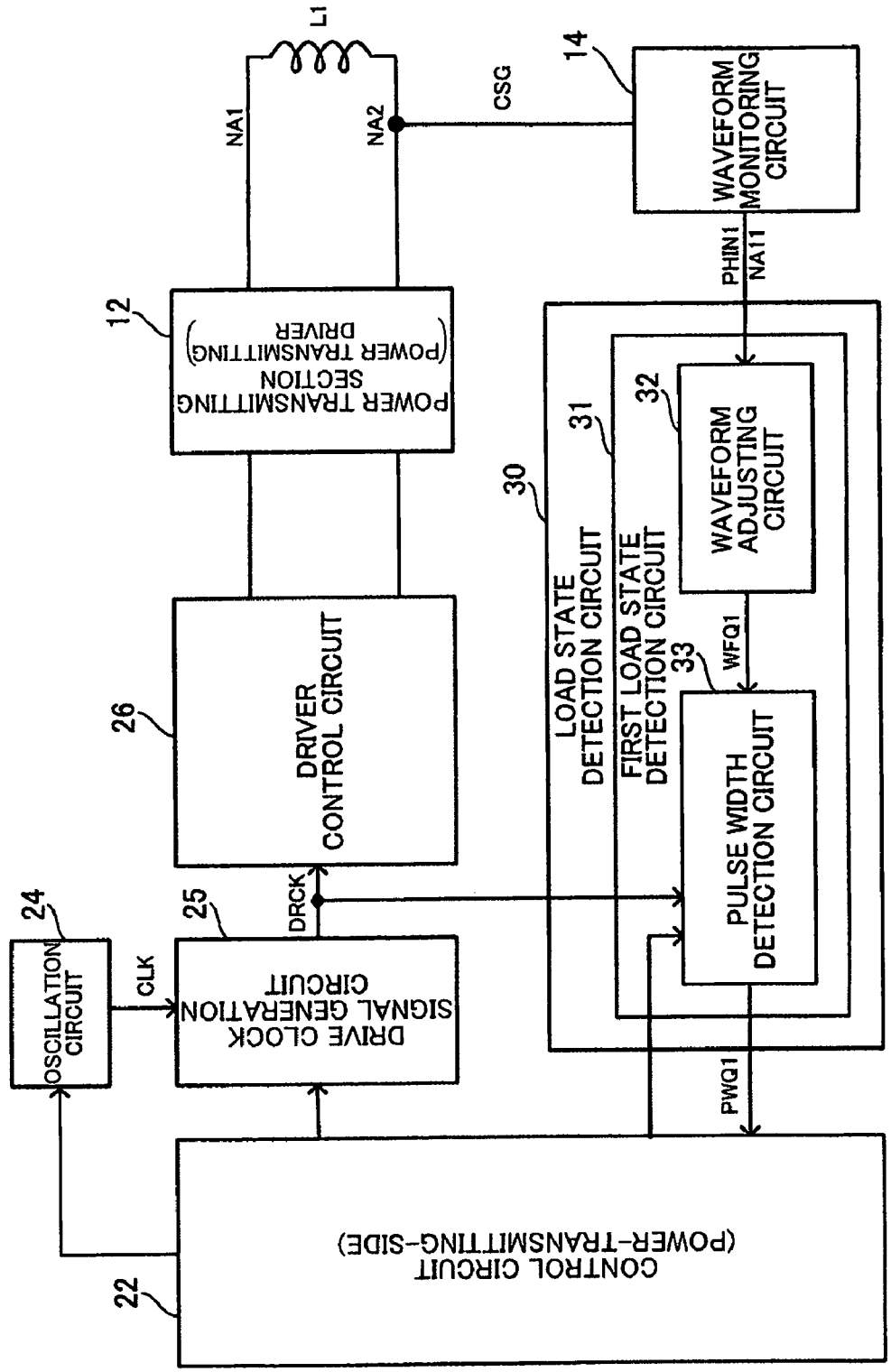
FIG. 8 shows a configuration example of a first modification according to one embodiment of the invention.

FIG. 8 shows a first modification of this embodiment. In FIG. 8, when the inductance of the primary coil L1, the capacitance of the capacitor that forms the resonant circuit, the power supply voltage, or the distance or the positional relationship between the primary coil L1 and the secondary coil L2 has changed, the voltage peak (amplitude) of an induced voltage signal PHIN1 also changes. Therefore, a change in load may not be accurately detected by merely detecting the peak voltage of the induced voltage signal PHIN1. In FIG. 8, a change in load due to insertion of a foreign object or the like is detected by detecting the pulse width information relating to the induced voltage signal PHIN1.

In FIG. 8, the load state detection circuit 30 includes a first load state detection circuit 31 that detects a change in the waveform of the first induced voltage signal PHIN1 of the primary coil L1. The first load state detection circuit 31 includes a first waveform adjusting circuit 32 and a first pulse width detection circuit 33. The waveform adjusting circuit 32 (pulse signal generation circuit) adjusts the waveform of the induced voltage signal PHIN1 of the primary coil L1, and outputs a waveform-adjusted signal WFQ1. Specifically, the waveform adjusting circuit 32 outputs the square wave (rectangular wave) waveform-adjusted signal WFQ1 (pulse signal) that becomes active (e.g., H level) when the signal PHIN1 has exceeded a given threshold voltage, for example.

The pulse width detection circuit 33 detects the pulse width information relating to the induced voltage signal PHIN1 of the primary coil L1. Specifically, the pulse width detection circuit 33 receives the waveform-adjusted signal WFQ1 from the waveform adjusting circuit 32 and the drive clock signal DRCK (drive control signal) from the drive clock signal generation circuit 25, and detects the pulse width information relating to the waveform-adjusted signal WFQ1 to detect the pulse width information relating to the induced voltage signal PHIN1.

For example, a timing when the induced voltage signal PHIN1 that has changed from a voltage GND (low-potential-side power supply voltage) exceeds a first threshold voltage VT1 is referred to as a first timing. In this case, the pulse width detection circuit 33 measures a first pulse width period that is a period between a first edge timing (e.g., falling edge timing) of the drive clock signal DRCK and the first timing to detect first pulse width information. For example, the pulse width detection circuit 33 measures the first pulse width period in which the voltage signal PHIN1 induced by a change in the voltage of the drive clock signal DRCK becomes equal to or lower than the given threshold voltage VT1. The pulse width detection circuit 33 measures the pulse width of the waveform-adjusted signal WFQ1 (induced voltage signal) with respect to the pulse width of the drive clock signal DRCK. In this case, the first pulse width period is measured using the reference clock signal CLK, for example. A latch circuit (not shown) latches measurement result data PWQ1 obtained by the pulse width detection circuit 33, for example. Specifically, the pulse width detection circuit 33 measures the first pulse width period using a counter that increments (or decrements) the count value based on the reference clock signal CLK, and the latch circuit latches the measurement result data PWQ1.

The control circuit 22 detects the power-receiving-side (secondary-side) load state (change in load or degree of load) based on the pulse width information detected by the pulse width detection circuit 33. Specifically, the control circuit 22 performs the foreign object detection process (primary foreign object detection process) based on the pulse width information detected by the pulse width detection circuit 33. Alternatively, the control circuit 22 may detect data transmitted from the power receiving device 40 by means of load modulation.

FIGS. 9A to 9C show measurement results for the signal waveforms of the drive clock signal DRCK, the coil end signal CSG, the induced voltage signal PHIN1, and a pulse signal PLS1. FIGS. 9A, 9B, and 9C show signal waveforms (voltage waveforms) in a low-load state (e.g., secondary-side load current=0 mA), a medium-load state (e.g., secondary-side load current=70 mA), and a high-load state (e.g., secondary-side load current=150 mA), respectively. The pulse signal PLS1 used for pulse width detection is a signal that is set at the H level at a first timing TM1 when the induced voltage signal PHIN1 exceeds the first threshold voltage VT1, and is set at the L level at a rising edge timing TR of the drive clock signal DRCK. As the threshold voltage VT1 (e.g., a threshold voltage of an N-type transistor) used to measure the pulse width period, a voltage at which the load state detection accuracy is optimized may be appropriately selected.

As shown in FIGS. 9A to 9C, the pulse width period XTPW1 of the pulse signal PLS1 increases as the power-receiving-side load increases (i.e., the load current increases). Therefore, the power-receiving-side load state (degree of load) can be detected by measuring the pulse width period XTPW1. For example, when a foreign object such as a metal has been placed on the primary coil L1 (inserted between the primary coil L1 and the secondary coil L2), power is supplied to the foreign object from the primary-side instrument so that the power-receiving-side instrument is overloaded. In this case, the overload state can be detected by measuring the pulse width period XTPW1 so that the foreign object detection process (primary foreign object detection process) can be implemented. Moreover, whether the data transmitted from the power-receiving-side instrument is "0" or "1" can be detected by determining the degree of load of the load modulation section 46 of the power receiving device 40 by measuring the pulse width period XTPW1.

In FIGS. 9A to 9C, the period from the timing TM1 to the rising edge timing TR of the drive clock signal DRCK is defined as the pulse width period XTPW1. In this case, the first load state detection circuit 31 detects the pulse width period XTPW1 of the pulse signal PLS1 as the first pulse width information. Note that it is desirable that the period from a falling edge timing TF of the drive clock signal DRCK to the timing TM1 be specified as the pulse width period TPW1 (see FIG. 12), and the first load state detection circuit 31 detect the pulse width period TPW1 as the first pulse width information. This prevents a situation in which the pulse width period is measured while regarding a noise signal as the pulse signal when the power-receiving-side load is low. In this case, the pulse width period TPW1 decreases as the power-receiving-side load increases. This makes it possible to determine that a foreign object has been placed (inserted) on the primary coil L1 when the pulse width period TPW1 (pulse width count) has become shorter than a given period (given count) so that the foreign object can be detected.

FIG. 10A shows a primary-side equivalent circuit in a no-load state, and FIG. 10B shows a primary-side equivalent circuit in a load-connected state. In a no-load state shown in FIG. 10A, a series resonant circuit is formed by a capacitance C, a primary-side leakage inductance L11, and a coupling inductance M. Therefore, the resonance characteristics in a no-load state have a sharp profile with a high Q value, as indicated by B1 in FIG. 10C. A secondary-side leakage inductance L12 and a resistance RL of the secondary-side load are added in a load-connected state. Therefore, resonance frequencies fr2 and fr3 in a load-connected state are higher than a resonance frequency fr1 in a no-load state, as shown in FIG. 10C. The resonance characteristics in a load-connected state have a gentle profile with a low Q value due to the effect of the resistance RL. The resonance frequency increases as the load increases from a low-load state (RL: high) to a high-load state (RL: low), and approaches the drive frequency of the coil (frequency of the drive clock signal DRCK).

When the resonance frequency approaches the drive frequency, a sine wave (resonance waveform) is gradually observed. In the voltage waveform in a low-load state shown in FIG. 9A, a square wave (drive waveform) is predominant over a sine wave (resonance waveform). In the voltage waveform in a high-load state shown in FIG. 9C, a sine wave (resonance waveform) is predominant over a square wave (drive waveform). As a result, the pulse width period XTPW1 increases (the pulse width period TPW1 decreases) as the load increases. Therefore, a change (degree) in power-receiving-side load can be determined using a simple configuration by measuring the pulse width period XTPW1 (TPW1).

For example, a change in power-receiving-side load due to insertion of a metal foreign object or the like may be determined by detecting only a change in the peak voltage of the coil end signal. However, the peak voltage also changes due to the distance and the positional relationship between the primary coil L1 and the secondary coil L2 in addition to a change in load. Therefore, a variation in load change detection increases.

In the pulse width detection method according to this embodiment, a change in load is detected by measuring the pulse width period that changes due to the power-receiving-side load state by digital processing instead of detecting the peak voltage. Therefore, a change in load can be detected with a small variation.

A change in power-receiving-side load may be determined based on phase characteristics due to load. The term "phase characteristics due to load" used herein refers to a voltage/current phase difference. This method complicates the circuit configuration and increases cost.

In the pulse width detection method according to this embodiment, since digital data can be processed using a simple waveform adjusting circuit and a counter circuit (counter) utilizing the voltage waveform, the circuit configuration can be simplified. Moreover, the pulse width detection method according to this embodiment can be easily combined with the amplitude detection method that detects a change in load by detecting the peak voltage.

In the pulse width detection method according to this embodiment, the pulse width period XTPW1 specified by the timing TM1 when the induced voltage signal PHIN1 that has changed from 0 V (GND) exceeds the threshold voltage VT1 is measured, as shown in FIGS. 9A to 9C. Therefore, an adverse effect of a change in power supply voltage or a change in distance or positional relationship between the primary coil and the secondary coil can be reduced by setting the threshold voltage VT1 at a value close to 0 V, whereby a change in load can be detected with a further reduced variation.

Figure 11:
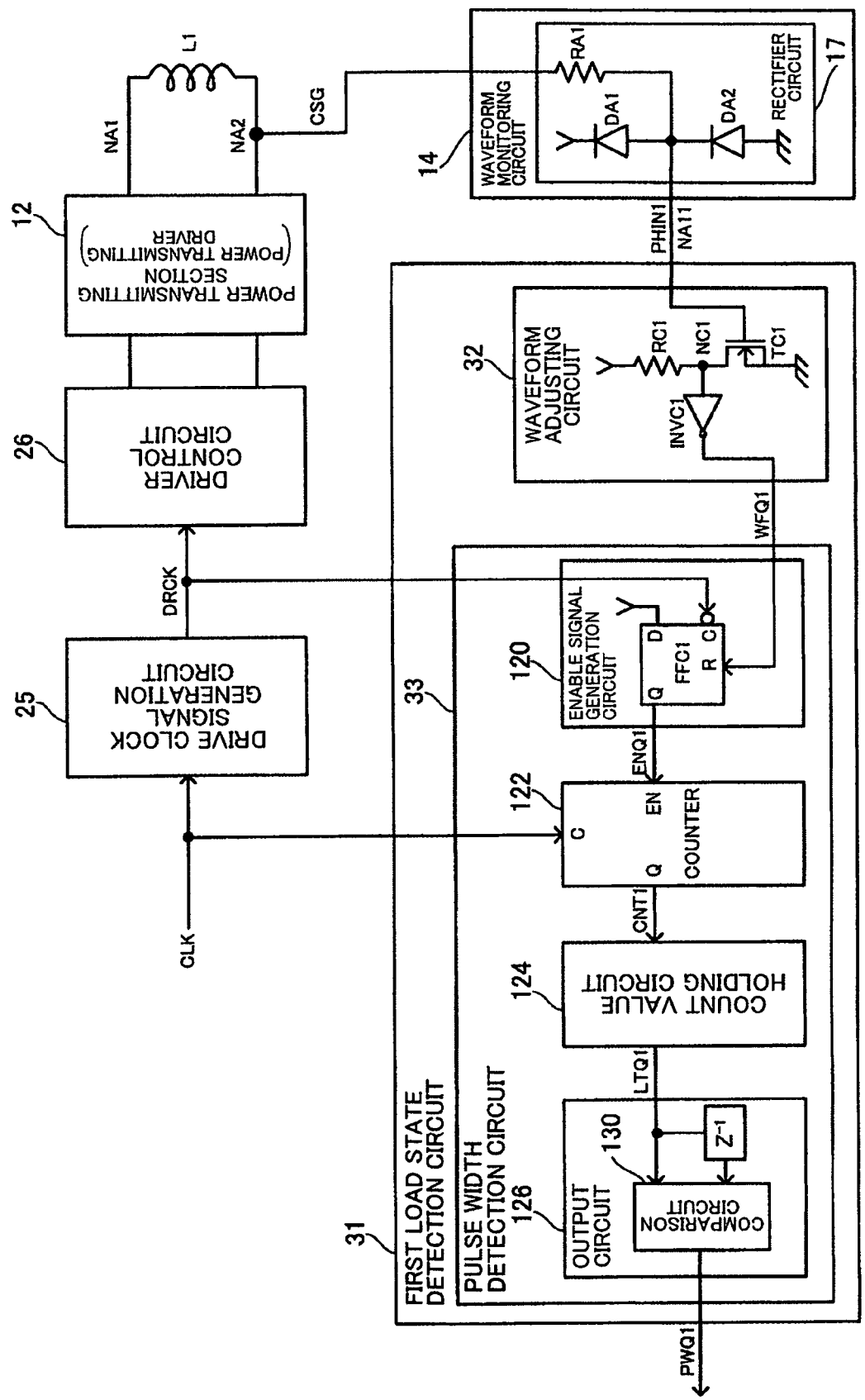
FIG. 11 shows a specific configuration example of the first modification.

FIG. 11 shows a specific configuration example of the power transmission control device 20 and the waveform monitoring circuit 14 according to the first modification. The waveform monitoring circuit 14 includes a first rectifier circuit 17 having a limiter function. The rectifier circuit 17 includes a current-limiting resistor RA1 provided between a coil end node NA2 at which the coil end signal CSG of the primary coil L1 is generated and a first monitor node NA11 at which the waveform-monitoring induced voltage signal PHIN1 is generated. The rectifier circuit 17 performs a limiter operation that clamps the induced voltage signal PHIN1 at a voltage VDD (high-potential-side power supply voltage), and subjects the induced voltage signal PHIN1 to half-wave rectification.

A situation in which an overcurrent from the coil end node NA2 flows into an IC terminal of the power transmission control device 20 is prevented by providing the current-limiting resistor RA1. A situation in which a voltage equal to or higher than the maximum rated voltage is applied to the IC terminal of the power transmission control device 20 is also prevented by causing the rectifier circuit 17 to clamp the induced voltage signal PHIN1 at the voltage VDD. Moreover, a situation in which a negative voltage is applied to the IC terminal of the power transmission control device 20 is prevented by causing the rectifier circuit 17 to subject the induced voltage signal PHIN1 to half-wave rectification.

Specifically, the rectifier circuit 17 includes a first diode DA1 provided between the monitor node NA11 and a VDD (high-potential-side power supply in a broad sense) node, the forward direction of the first diode DA1 being a direction from the monitor node NA11 to the VDD node. The rectifier circuit 17 also includes a second diode DA2 provided between the monitor node NA11 and a GND (low-potential-side power supply in a broad sense) node, the forward direction of the second diode DA2 being a direction from the GND node to the monitor node NA11. The VDD limit operation is implemented using the diode DA1, and half-wave rectification is implemented using the diode DA2.

Note that a Zener diode may be provided instead of the diode DA1. Specifically, a Zener diode may be provided between the monitor node NA11 and the GND (low-potential-side power supply) node, the forward direction of the Zener diode being a direction from the GND node to the monitor node NA11.

The waveform adjusting circuit 32 (first waveform adjusting circuit) includes a resistor RC1 and an N-type transistor TC1 connected in series between the power supply VDD (high-potential-side power supply) and the power supply GND (low-potential-side power supply), and an inverter circuit INVC. The induced voltage signal PHIN1 from the waveform monitoring circuit 14 is input to the gate of the transistor TC1. When the signal PHIN1 has exceeded the threshold voltage of the transistor TC1, the transistor TC1 is turned ON so that the voltage of a node NC1 is set at the L level. Therefore, the waveform-adjusted signal WFQ1 is set at the H level. When the signal PHIN1 has become lower than the threshold voltage, the waveform-adjusted signal WFQ1 is set at the L level.

The pulse width detection circuit 33 includes a first counter 122. The counter 122 increments (or decrements) the count value in the pulse width period, and measures the pulse width period (first pulse width period) based on the resulting count value. In this case, the counter 122 counts the count value based on the reference clock signal CLK, for example.

More specifically, the pulse width detection circuit 33 includes a first enable signal generation circuit 120. The enable signal generation circuit 120 receives the first waveform-adjusted signal WFQ1 and the drive clock signal DRCK, and generates a first enable signal ENQ1 that becomes active in the first pulse width period. The counter 122 increments (or decrements) the count value when the enable signal ENQ1 is active (e.g., H level).

The enable signal generation circuit 120 may be formed using a flip-flop circuit FFC1, the drive clock signal DRCK (including a signal equivalent to the drive clock signal DRCK) being input to a clock terminal (inverting clock terminal) of the flip-flop circuit FFC1, a voltage VDD (high-potential-side power supply voltage) being input to a data terminal of the flip-flop circuit FFC1, and the waveform-adjusted signal WFQ1 (including a signal equivalent to the waveform-adjusted signal WFQ1) being input to a reset terminal (non-inverting reset terminal) of the flip-flop circuit FFC1. When the waveform-adjusted signal WFQ1 is set at the L level and the drive clock signal DRCK is then set at the L level, the enable signal ENQ1 (i.e., output signal) from the flip-flop circuit FFC1 is set at the H level (active). When the waveform-adjusted signal WFQ1 is set at the H level, the flip-flop circuit FFC1 is reset so that the enable signal ENQ1 (output signal) from the flip-flop circuit FFC1 is set at the L level (inactive). Therefore, the counter 122 can measure the pulse width period by counting the period in which the enable signal ENQ1 is set at the H level (active) based on the reference clock signal CLK.

Note that the enable signal generation circuit 120 may be formed using a flip-flop circuit, the drive clock signal DRCK being input to a clock terminal of the flip-flop circuit, a data terminal of the flip-flop circuit being connected to the power supply GND (low-potential-side power supply), and the waveform-adjusted signal WFQ1 being input to a set terminal of the flip-flop circuit. In this case, a signal obtained by inverting the output signal from the flip-flop circuit may be input to the counter 122 as the enable signal ENQ1.

A count value holding circuit 124 holds a count value CNT1 (pulse width information) from the counter 122. The count value holding circuit 124 outputs data LTQ1 relating to the held count value to an output circuit 126.

The output circuit 126 (filter circuit or noise removal circuit) receives the data LTQ1 relating to the count value held by the count value holding circuit 124, and outputs the data PWQ1 (first pulse width information). The output circuit 126 may include a comparison circuit 130 that compares the count value currently held by the count value holding circuit 124 with the count value previously held by the count value holding circuit 124, and outputs the count value larger than the other, for example. This allows the maximum count value to be held by and output from the output circuit 126. This suppresses a change in the pulse width period due to noise or the like so that the pulse width can be stably detected. Moreover, the pulse width detection method can be easily combined with the amplitude detection method.

Figure 12:
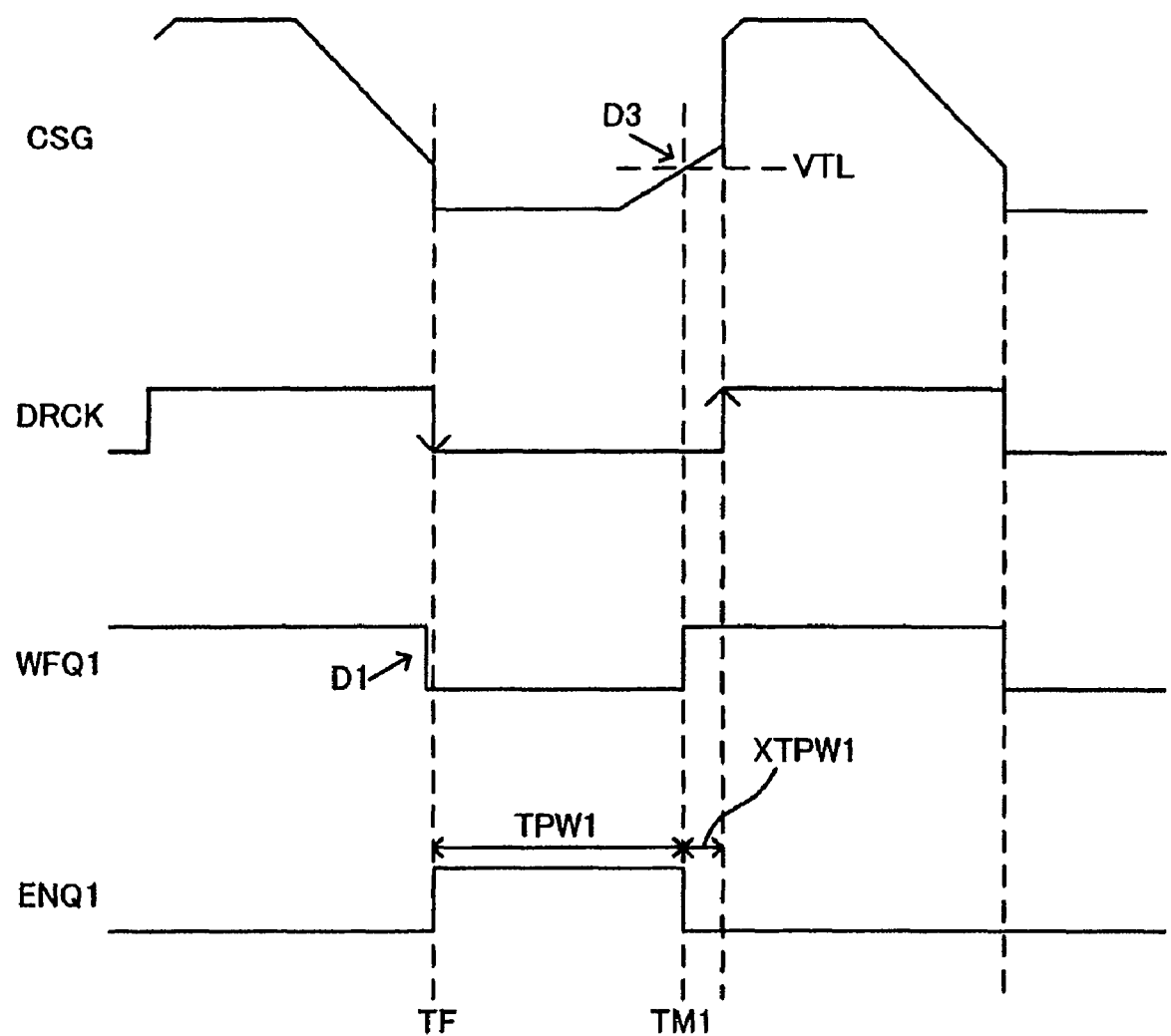
FIG. 12 shows a signal waveform example illustrative of the operation according to the first modification.

FIG. 12 shows a signal waveform example illustrative of the operation of the circuit shown in FIG. 11. When the waveform-adjusted signal WFQ1 is set at the L level at a timing indicated by D1 in FIG. 12, the reset state of the flip-flop circuit FFC1 is canceled. The voltage VDD is input to the flip-flop circuit FFC1 at the falling edge timing TF of the drive clock signal DRCK so that the enable signal ENQ1 changes from the L level to the H level. This causes the counter 122 to start the count process and measure the pulse width period TPW1 using the reference clock signal CLK.

When the waveform-adjusted signal WFQ1 is set at the H level at the first timing TM1, the flip-flop circuit FFC1 is reset so that the enable signal ENQ1 changes from the H level to the L level. This causes the counter 122 to stop the count process. The count value obtained by the count process is the measurement result that indicates the pulse width period TPW1.

As shown in FIG. 12, the sum of the pulse width periods TPW1 and XTPW1 corresponds to the half-cycle period of the drive clock signal DRCK. The pulse width period XTPW1 shown in FIGS. 9A to 9C increases as the power-receiving-side load increases. Therefore, the pulse width period TPW1 shown in FIG. 12 decreases as the power-receiving-side load increases. In the pulse width period XTPW1 shown in FIGS. 9A to 9C, it is difficult to distinguish a noise signal from a pulse signal when the power-receiving-side load is low. Such a problem can be prevented using the pulse width period TPW1 shown in FIG. 12.

In the first pulse width detection method according to this embodiment, the pulse width period TPW1 is specified based on the timing TM1 when the coil end signal CSG that has changed from 0 V exceeds a low-potential-side threshold voltage VTL, as indicated by D3 in FIG. 12. Specifically, the pulse width period TPW1 is the period between the falling edge timing TF of the drive clock signal CLK and the timing TM1. The pulse width period TPW1 changes when the timing TM1 has changed due to a change in the power-receiving-side load. Since the threshold voltage VTL that determines the timing TM1 is a low voltage, the timing TM1 varies to only a small extent even if the power supply voltage or the like has changed. The timing TM1 varies to only a small extent even if the distance or the positional relationship between the coils L1 and L2 has changed. Therefore, the first method according to this embodiment implements a pulse width detection method that reduces an adverse effect of a change in power supply voltage or the like.

The rectifier circuit 17 shown in FIG. 11 outputs the coil end signal CSG to the waveform adjusting circuit 32 as the induced voltage signal PHIN1 without dividing the voltage of the coil end signal CSG, differing from a rectifier circuit described later utilizing the second method according to this embodiment. Therefore, the threshold voltage VTL shown in FIG. 12 is almost equal to the threshold voltage of the N-type transistor TC1 of the waveform adjusting circuit 32 shown in FIG. 11, and is almost equal to the threshold voltage VT1 shown in FIGS. 9A to 9C.

Note that the configuration of the waveform adjusting circuit 32 is not limited to the configuration shown in FIG. 11. For example, the waveform adjusting circuit 32 may be formed using a comparator or the like. Note that the configuration of the enable signal generation circuit 120 is not limited to the configuration shown in FIG. 11. For example, the enable signal generation circuit 120 may be formed using a logic circuit such as a NOR circuit or a NAND circuit. Note also that the configuration of the output circuit 126 is not limited to the configuration shown in FIG. 11. For example, the output circuit 126 may be formed using an averaging circuit that calculates the average value (moving average) of a plurality of count values (e.g., the current count value and the preceding count value).

6. Second Modification

Figure 13:
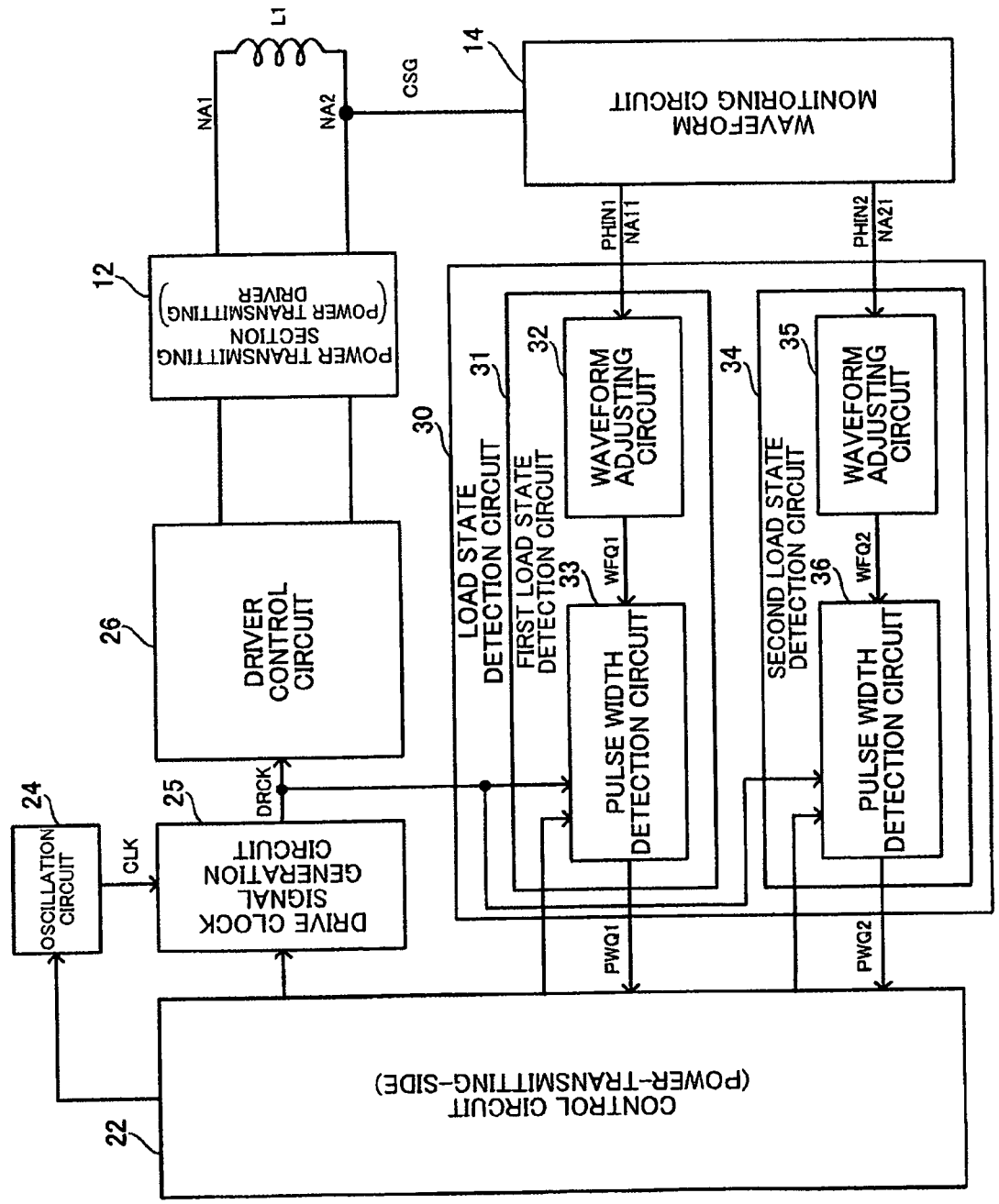
FIG. 13 shows a configuration example of a second modification according to one embodiment of the invention.

FIG. 13 shows a second modification of this embodiment. In the second modification, the load state detection circuit 30 includes a second load state detection circuit 34 that detects a change in the waveform of a second induced voltage signal PHIN2 of the primary coil L1 in addition to the first load state detection circuit 31 described with reference to FIGS. 8 and 11. The first load state detection circuit 31 detects the pulse width using the first pulse width detection method described with reference to FIGS. 9A to 9C and the like. On the other hand, the second load state detection circuit 34 detects the pulse width using the second pulse width detection method described later with reference to FIGS. 14A to 14C.

The second load state detection circuit 34 includes a second waveform adjusting circuit 35 and a second pulse width detection circuit 36. The waveform adjusting circuit 35 adjusts the waveform of the induced voltage signal PHIN2 of the primary coil L1, and outputs a waveform-adjusted signal WFQ2. Specifically, the waveform adjusting circuit 35 outputs the square wave (rectangular wave) waveform-adjusted signal WFQ1 that becomes active (e.g., H level) when the signal PHIN2 has exceeded a given threshold voltage, for example.

The pulse width detection circuit 36 detects the pulse width information relating to the induced voltage signal PHIN2 of the primary coil L1. Specifically, the pulse width detection circuit 36 receives the waveform-adjusted signal WFQ2 from the waveform adjusting circuit 35 and the drive clock signal DRCK from the drive clock signal generation circuit 25, and detects the pulse width information relating to the waveform-adjusted signal WFQ2 to detect the pulse width information relating to the induced voltage signal PHIN2.

For example, a timing when the induced voltage signal PHIN2 that has changed from the high-potential-side power supply voltage (VDD) becomes lower than a second threshold voltage VT2 is referred to as a second timing. In this case, the pulse width detection circuit 36 measures a second pulse width period that is a period between a second edge timing (e.g., rising edge timing) of the drive clock signal DRCK and the second timing to detect second pulse width information. For example, the pulse width detection circuit 36 measures the second pulse width period in which the voltage signal PHIN2 induced by a change in the voltage of the drive clock signal DRCK becomes equal to or higher than the given threshold voltage VT2. The pulse width detection circuit 36 measures the pulse width of the waveform-adjusted signal WFQ2 (induced voltage signal) with respect to the pulse width of the drive clock signal DRCK. In this case, the pulse width detection circuit 36 measures the pulse width period using the reference clock signal CLK, for example. A latch circuit (not shown) latches measurement result data PWQ2 obtained by the pulse width detection circuit 36, for example. Specifically, the pulse width detection circuit 36 measures the pulse width period using a counter that increments (or decrements) the count value based on the reference clock signal CLK, and the latch circuit latches the measurement result data PWQ2.

The control circuit 22 performs the foreign object detection process (secondary foreign object detection process) based on the pulse width information detected by the pulse width detection circuit 36. Alternatively, the control circuit 22 detects data transmitted from the power receiving device 40 by means of load modulation.

FIGS. 14A to 14C show measurement results for the signal waveforms of the drive clock signal DRCK, the coil end signal CSG, the induced voltage signal PHIN2, and a pulse signal PLS2. FIGS. 14A, 14B, and 14C show signal waveforms in a low-load state, a medium-load state, and a high-load state, respectively. The pulse signal PLS2 used for pulse width detection is a signal that is set at the H level at a second timing TM2 when the induced voltage signal PHIN2 becomes lower than the second threshold voltage VT2, and is set at the L level at a falling edge timing TF of the drive clock signal DRCK. As the threshold voltage VT2 (e.g., a threshold voltage of an N-type transistor) used to measure the pulse width period, a voltage at which the load state detection accuracy is optimized may be appropriately selected.

As shown in FIGS. 14A to 14C, the pulse width period XTPW2 of the pulse signal PLS2 increases as the power-receiving-side load increases. Therefore, the power-receiving-side load state can be detected by measuring the pulse width period XTPW2. Specifically, a foreign object can be detected (secondary foreign object detection process), or whether data (save frame) transmitted from the power-receiving-side instrument is "0" or "1" can be detected.

Figure 15:
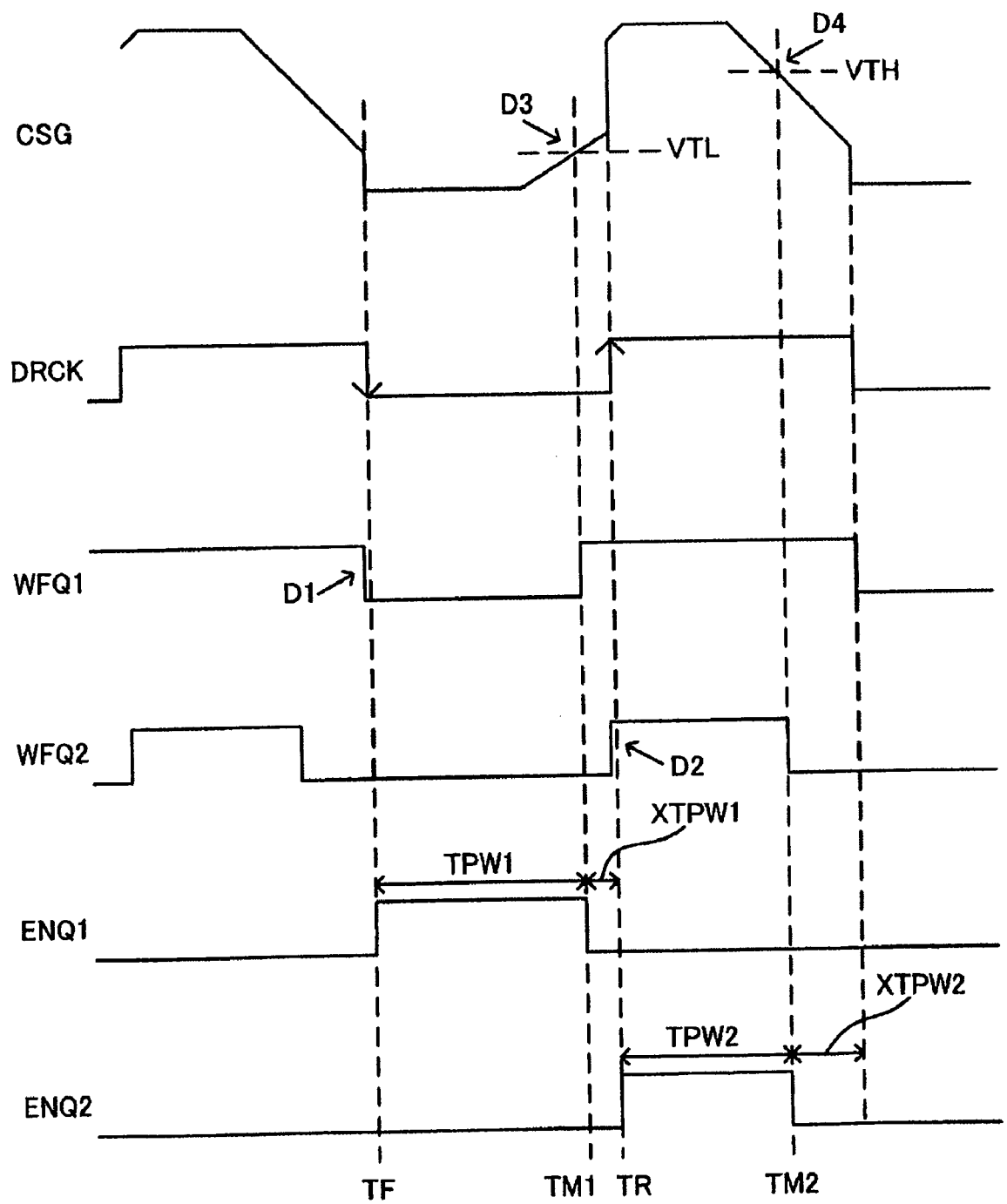
FIG. 15 shows a signal waveform example illustrative of the operation according to the second modification.

In FIGS. 14A to 14C, the period from the timing TM2 to the falling edge timing TF of the drive clock signal DRCK is defined as the pulse width period XTPW2. In this case, the second load state detection circuit 34 detects the pulse width period XTPW2 of the pulse signal PLS2 as the second pulse width information. Note that it is desirable that the period from the rising edge timing TR of the drive clock signal DRCK to the timing TM2 be specified as the pulse width period TPW2 (see FIG. 15), and the second load state detection circuit 34 detect the pulse width period TPW2 as the second pulse width information. This prevents a situation in which the pulse width period is measured while regarding a noise signal as the pulse signal when the power-receiving-side load is low. In this case, the pulse width period TPW2 decreases as the power-receiving-side load increases.

The second method (falling edge detection system) shown in FIGS. 14A to 14C has an advantage over the first method (rising edge detection method) shown in FIGS. 9A to 9C in that the pulse width (count value) changes to a large extent even if a change in load is small so that high sensitivity is achieved. On the other hand, the first method shown in FIGS. 9A to 9C has an advantage over the second method shown in FIGS. 14A to 14C in that a variation in pulse width detection is small with respect to a change in power supply voltage or a change in the distance or the positional relationship between the primary coil L1 and the secondary coil L2.

In the second modification shown in FIG. 13, the first load state detection circuit 31 detects the waveform using the first method and the resulting first pulse width information (PWQ1) is used during the primary foreign object detection process (i.e., the foreign object detection process performed before starting normal power transmission). The second load state detection circuit 34 detects the waveform using the second method and the resulting second pulse width information (PWQ2) is used during the secondary foreign object detection process (i.e., the foreign object detection process after starting normal power transmission). Data (data that indicates full-charge detection or the like) transmitted from the power-receiving-side instrument is also detected using the second pulse width information, for example.

Specifically, the primary foreign object detection process is performed in a no-load state before starting normal power transmission, for example. The primary foreign object detection process is performed using the first method that varies to only a small extent due to a change in power supply voltage or the like. Therefore, a foreign object can be stably detected even if a change in power supply voltage or the like has occurred. Moreover, the pulse width count value obtained by the primary foreign object detection process can be set as a reference value. The secondary foreign object detection after starting normal power transmission can be performed, or whether data transmitted from the power-receiving-side instrument is "0" or "1" can be detected, based on the reference value in a no-load state. As a result, a change in load can be detected efficiently.

The specific configuration and operation of the waveform adjusting circuit 35 and the pulse width detection circuit 36 shown in FIG. 13 are similar to the specific configuration and operation of the waveform adjusting circuit 32 and the pulse width detection circuit 33 described with reference to FIG. 11. Therefore, description thereof is omitted.

7. Regular Authentication Process

Figure 5:
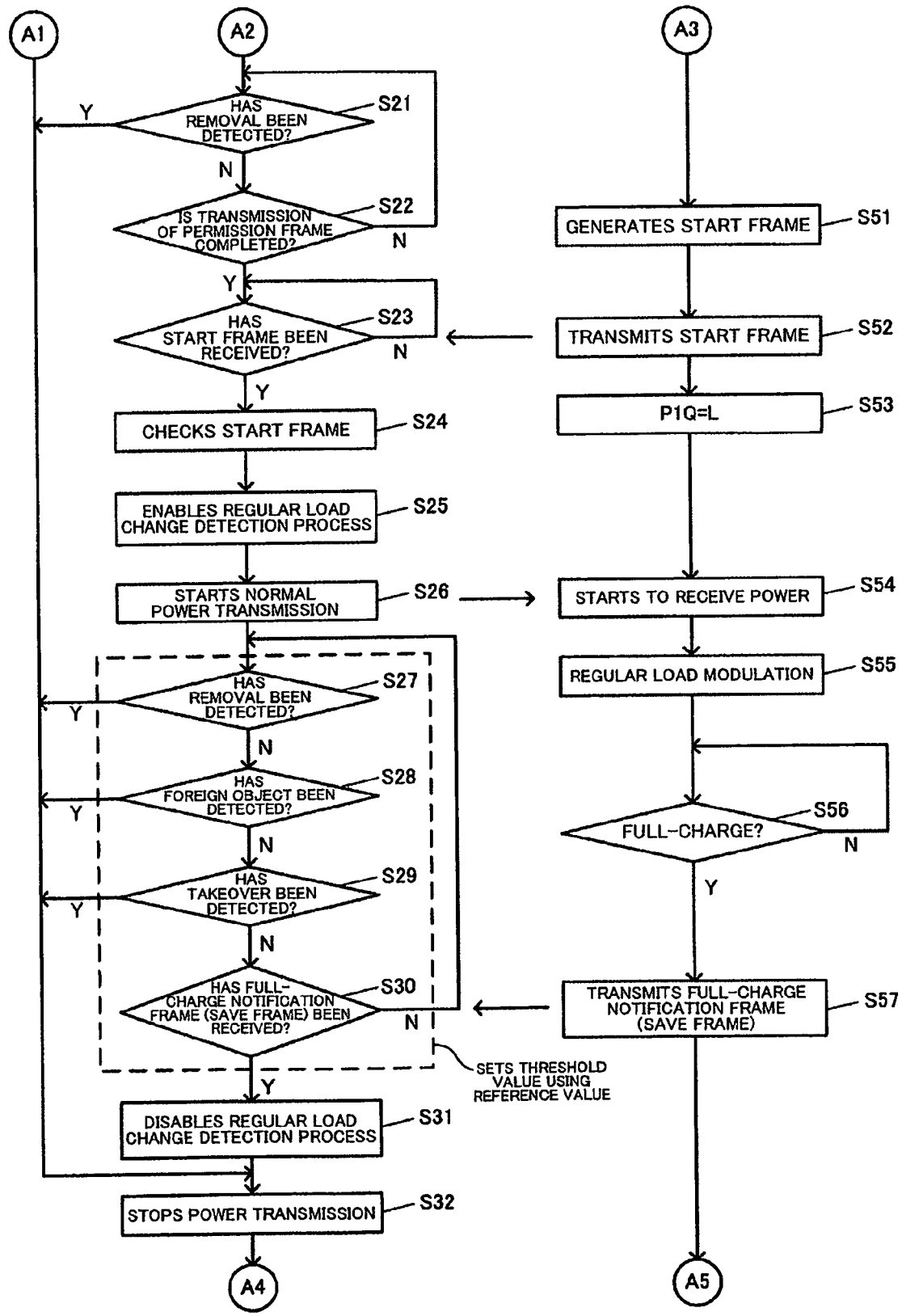
FIG. 5 is a flowchart illustrative of the operation according to one embodiment of the invention.

In this embodiment, a regular authentication process is performed in the normal power transmission period by enabling the regular load change detection process, as indicated by the step S25 shown in FIG. 5. In the regular authentication process, whether or not a takeover state due to a foreign object has occurred is detected by intermittently changing the power-receiving-side load in each regular authentication period during the normal power transmission period, and causing the power-transmitting-side instrument to detect the intermittent change in load.

Specifically, a large metal foreign object may be inserted between the primary coil L1 and the secondary coil L2 after normal power transmission (standard power transmission) has started after completion of the ID authentication process, for example. The power-transmitting-side instrument regards the large metal foreign object inserted between the primary coil L1 and the secondary coil L2 as the actual load. In this case, since the ID authentication process has been completed, the power-transmitting-side instrument continues power transmission regarding the metal foreign object as a load so that the power transmission energy from the power-transmitting-side instrument is continuously consumed by the metal foreign object. This causes a situation in which the temperature of the metal foreign object increases, for example. In this embodiment, a phenomenon in which the power-receiving-side instrument is replaced by a large metal foreign object or the like so that power is continuously transmitted to the foreign object is referred to as "takeover state".

Figure 16:
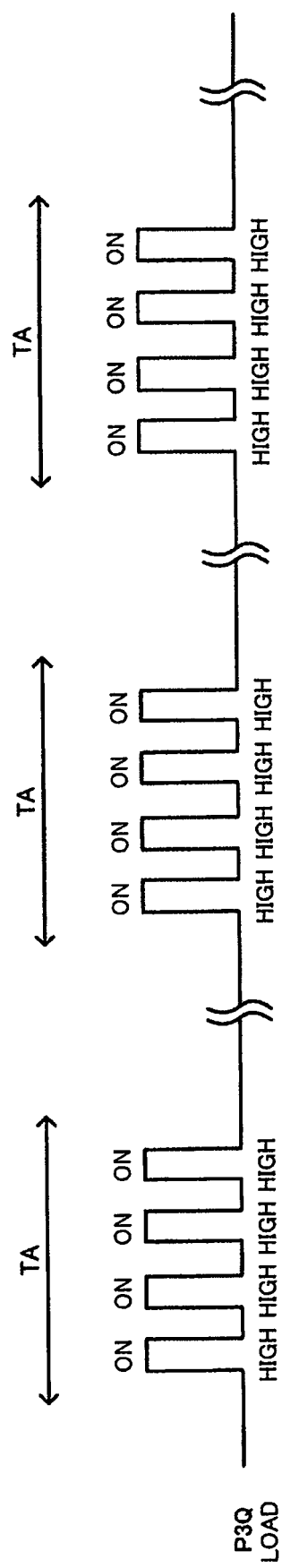
FIG. 16 is a view illustrative of a regular authentication process.

In this embodiment, as shown in FIG. 16, the power-receiving-side load is intermittently changed in a regular authentication period TA in order to detect such a takeover state. Specifically, the transistor TB3 of the load modulation section 46 is intermittently turned ON/OFF by intermittently changing the load modulation signal P3Q shown in FIG. 2. The power-receiving-side load increases relatively (low impedance) when the transistor TB3 is turned ON, and decreases relatively (high impedance) when the transistor TB3 is turned OFF. The load state detection circuit 30 of the power-transmitting-side instrument detects the intermittent change in the power-receiving-side load. For example, the load state detection circuit 30 detects the change in the power-receiving-side load by detecting a change in the pulse width period of the coil end signal, as described above with reference to FIGS. 7A, 7B, and the like. Specifically, the load state detection circuit 30 detects the change in the power-receiving-side load by detecting the pulse width period (TPW2 and XTPW2) when the coil end signal falls using the second pulse width detection method described with reference to FIGS. 14A to 15. Specifically, the regular authentication period TA is provided in the normal power transmission period in which power is consumed by the load 90. Therefore, since the pulse width changes to a large extent even if a change in load is small, the second pulse width detection method with high sensitivity is suitably used.

The number of intermittent changes in load in the regular authentication period TA is arbitrary (may be one or more). The regular authentication process may be performed cyclically (e.g., every 10 seconds) or non-cyclically. It is desirable to limit the amount of power consumed by the load 90 to achieve a low-load state in the regular authentication period TA. This makes it possible for the power-transmitting-side instrument to easily detect a regular change in load made by the load modulation section 46 of the power-receiving-side instrument.

8. Detailed Sequence

Figure 17:
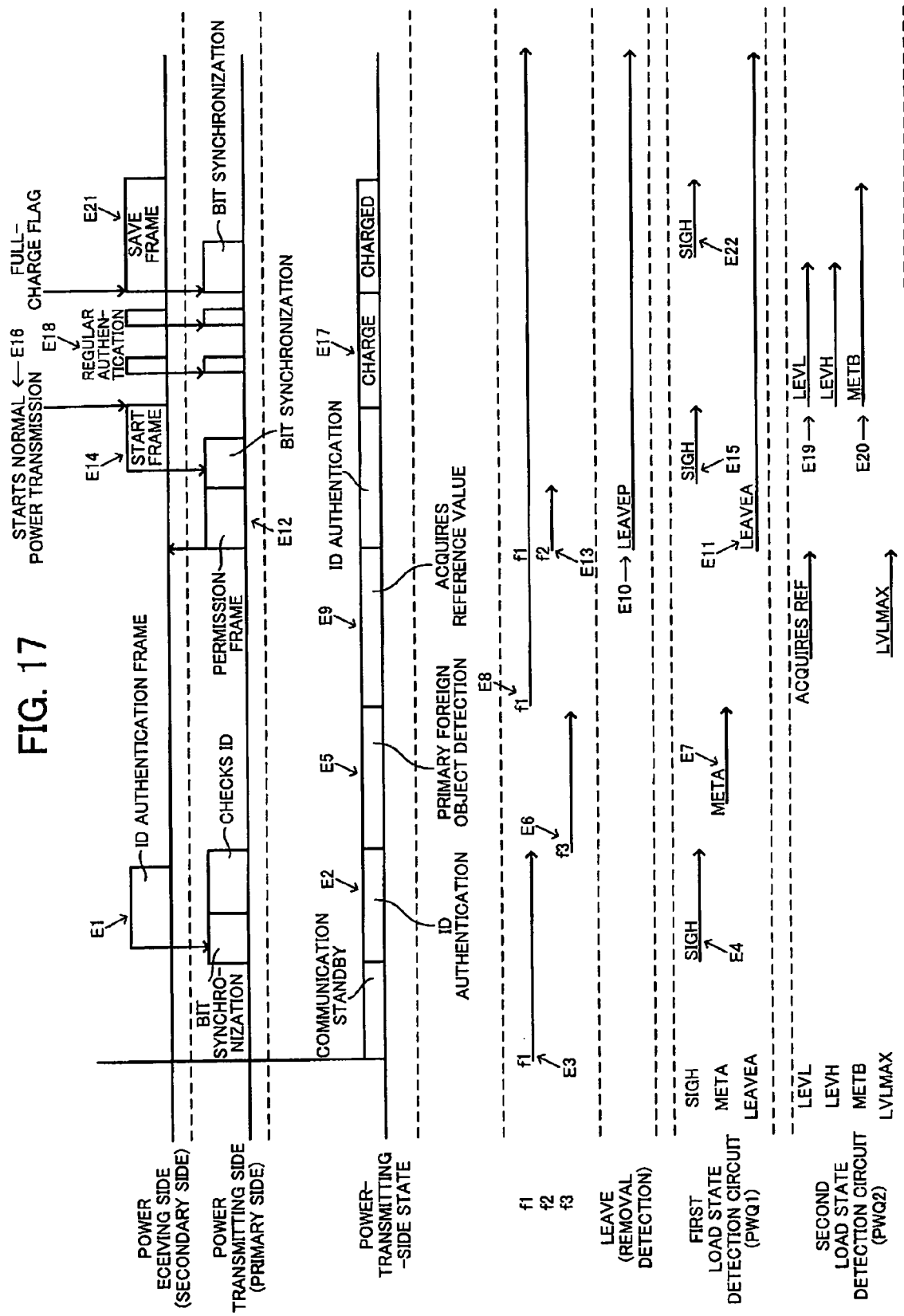
FIG. 17 is a detailed sequence diagram showing non-contact power transmission according to one embodiment of the invention.

FIG. 17 is a detailed sequence diagram showing non-contact power transmission according to this embodiment. When the power-transmitting-side instrument has performed position-detection temporary power transmission, the power-receiving-side instrument transmits the ID authentication frame, as indicated by E1 in FIG. 17. The power-transmitting-side instrument then performs the ID authentication process, as indicated by E2. In this case, the drive frequency is set at the normal power transmission frequency f1, as indicated by E3. The power-transmitting-side instrument determines whether the data contained in the ID authentication frame is "0" or "1" using a threshold value SIGH, as indicated by E4. Specifically, the power-transmitting-side instrument determines whether the data is "0" or "1" by comparing the output data PWQ1 (count value) (i.e., the pulse width information from the first load state detection circuit 31 that utilizes the first pulse width detection method) with the threshold value SIGH.

The power-transmitting-side instrument then performs the primary foreign object detection process, as indicated by E5. In this case, the drive frequency is set at the foreign object detection frequency f3, as indicated by E6. The power-transmitting-side instrument performs the primary foreign object detection process using the first threshold value META, as indicated by E7. Specifically, the power-transmitting-side instrument determines whether or not a foreign object has been detected by comparing the output data PWQ1 from the first load state detection circuit 31 with the threshold value META.

The power-transmitting-side instrument then sets the drive frequency at the normal power transmission frequency f1, as indicated by E8. The power-transmitting-side instrument then acquires the reference value, as indicated by E9. The power-transmitting-side instrument starts to detect whether or not the power-receiving-side instrument has been removed, as indicated by E10 and E11. Specifically, the power-transmitting-side instrument performs the removal detection process by detecting the amplitude information relating to the coil end signal (peak voltage or amplitude voltage) (E10), and detecting the pulse width using the first load state detection circuit 31 (E11).

The power-transmitting-side instrument then transmits the ID authentication permission frame, as indicated by E12. The power-transmitting-side instrument transmits the permission frame by means of frequency modulation (see FIG. 3A) using the drive frequencies f1 and f2, as indicated by E13.

The power-receiving-side instrument then transmits the start frame, as indicated by E14. The power-transmitting-side instrument determines whether the data contained in the start frame is "0" or "1" using the threshold value SIGH, as indicated by E15. The power-transmitting-side instrument then starts normal power transmission (E16) so that the load 90 is charged (E17).

In the normal power transmission period, the regular authentication process (see FIG. 16) is performed, as indicated by E18. The power-transmitting-side instrument detects a change in load due to the regular authentication process using the threshold values LEVL and LEVH, as indicated by E19. Specifically, the power-transmitting-side instrument detects a change in load by comparing the output data PWQ2 from the second load state detection circuit 34 with the threshold values LEVL and LEVH to detect whether or not a takeover state due to a foreign object has occurred. Note that "METB" indicated by E20 is an overload detection threshold value.

When the load 90 has been fully charged, the power-receiving-side instrument transmits the save frame that indicates that the load 90 has been fully charged, as indicated by E21. The power-transmitting-side instrument then determines whether the data contained in the save frame is "0" or "1" using the threshold value SIGH, as indicated by E22.

FIGS. 18A and 18B show setting examples of the pulse width threshold values used in this embodiment. FIG. 18A shows the threshold values for the first load state detection circuit 31, and FIG. 18B shows the threshold values for the second load state detection circuit 34.

As shown in FIG. 18A, the data detection threshold value SIGH is set on the load-connected side (i.e., in the direction in which the pulse width decreases) with respect to the first threshold value META used for the primary foreign object detection process. For example, whether or not the resistor RB3 (load) of the load modulation section 46 shown in FIG. 2 has been connected is determined by comparing the output data PWQ1 (pulse width information from the first load state detection circuit 31) with the threshold value SIGH to detect data. Whether or not a foreign object has been inserted before starting normal power transmission can be detected by comparing the output data PWQ1 with the threshold value META.

As shown in FIG. 18B, the second threshold value LEVL used for the secondary foreign object detection process is set on the load-connected side with respect to the first threshold value META used for the primary foreign object detection process (see FIG. 18A) so that LEVL≦META is satisfied. For example, the first threshold value META is used in a no-load state before starting normal power transmission. The second threshold value LEVL is used in a load-connected state after starting normal power transmission. Specifically, the second threshold value LEVL is used in a state in which power is consumed by the power-receiving-side load 90. Therefore, a foreign object can be appropriately detected in the normal power transmission period by setting the second threshold value LEVL to be equal to or smaller than the first threshold value META (LEVL≦META).

9. Threshold Value Setting

A method of setting the determination threshold value based on the reference value is described below. FIG. 19A shows an example of a table used to set the threshold values LEVL and LEVH based on a reference value REF.

When using the pulse width detection method, the threshold value REF acquired at E9 in FIG. 17 is a pulse width period count value. Specifically, the second load state detection circuit 34 (pulse width detection circuit 36) shown in FIG. 13 detects the pulse width period (pulse width information) of the induced voltage signal in the reference value acquisition period in which the power-receiving-side instrument is set in a no-load state, and outputs the pulse width period count value as the data PWQ2. The control circuit 22 acquires the data PWQ2 as the reference value REF, and stores the reference value REF in a register or the like. The control circuit 22 calculates the threshold values LEVL and LEVH used in the regular authentication process (foreign object detection process) based on the reference value REF and the table shown in FIG. 19A.

Specifically, the control circuit 22 calculates the threshold values LEVL and LEVH by subtracting given count values N1 and N2 (N2>N1) from the reference value REF. The threshold values LEVL and LEVH having the relationship shown in FIG. 18B can thus be calculated. In FIG. 18B, the reference value REF corresponds to the pulse width period count value in a no-load state, and the threshold value LEVL is calculated to be a count value on the load-connected side with respect to the reference value REF. The threshold value LEVH is calculated to be a count value on the load-connected side with respect to the threshold value LEVL.

The overload detection threshold value METB shown in FIG. 18B may also be set based on the reference value REF. In this case, a table similar to that shown in FIG. 19A in which the reference value REF is associated with the threshold METB may be provided.

The data detection threshold value SIGH shown in FIG. 18A may be set based on a reference value REFB. In this case, a table shown in FIG. 19B may be provided. Specifically, the first load state detection circuit 31 (pulse width detection circuit 33) shown in FIG. 13 detects the pulse width period (pulse width information) of the induced voltage signal in the reference value acquisition period in which the power-receiving-side instrument is set in a no-load state, and outputs the pulse width period count value as the data PWQ1. The control circuit 22 acquires the data PWQ1 as the reference value REFB (e.g., a value differing from the reference value REF), and stores the reference value REFB in a register or the like. The control circuit 22 calculates the threshold value SIGH used in the data detection process based on the reference value REFB and the table shown in FIG. 19B. Specifically, the control circuit 22 calculates the threshold value SIGH by subtracting a given count value N3 from the reference value REFB. The threshold value SIGH having the relationship shown in FIG. 18A can thus be calculated. In FIG. 18A, the reference value REFB corresponds to the pulse width period count value in a no-load state, and the threshold value SIGH is calculated to be a count value on the load-connected side with respect to the reference value REFB.

Figure 20A:
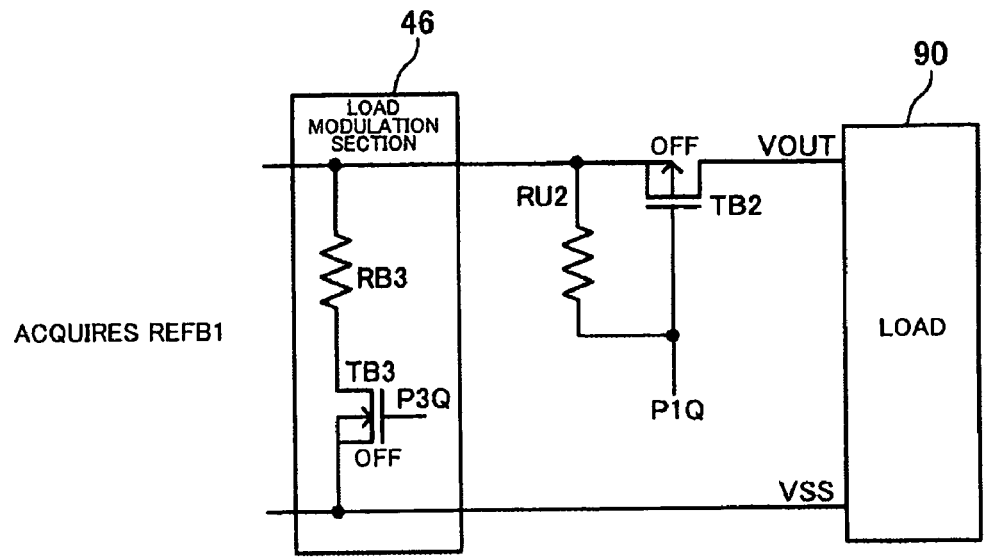
FIGS. 20A and 20B are views illustrative of a method of acquiring first and second reference values.
Figure 20B:
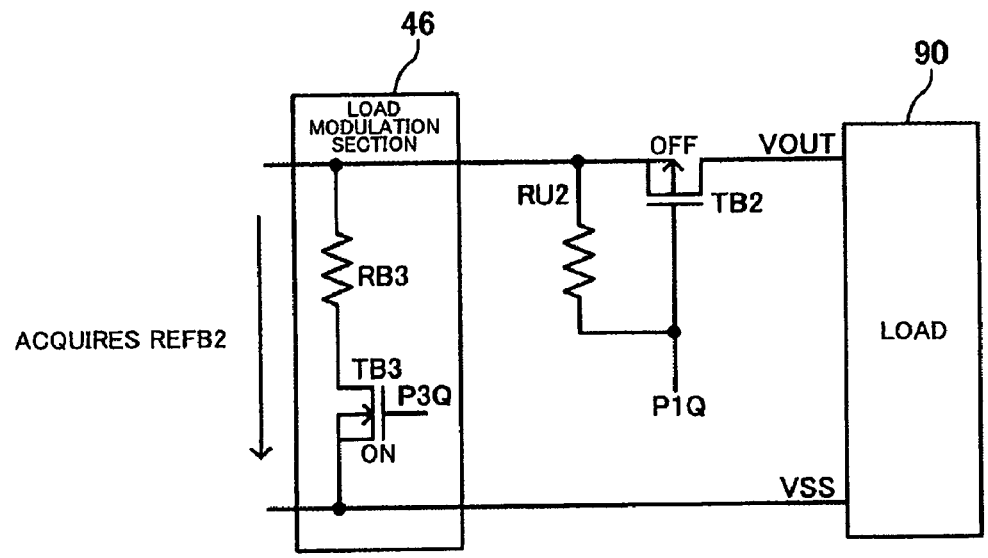

A method shown in FIGS. 20A and 20B may be used when calculating the data detection threshold value SIGH.

In FIGS. 20A and 20B, the load modulation section 46 of the power-receiving-side instrument variably changes the power-receiving-side load, for example. Specifically, the transistor TB2 is turned OFF based on the signal P1Q in the reference value acquisition period before normal power transmission starts so that the load 90 is electrically disconnected. The power-receiving-side load is changed by causing the transistor TB3 to be turned ON/OFF using the signal P3Q.

As shown in FIG. 20A, the control circuit 22 of the power-transmitting-side instrument acquires a first reference value REB1 when the load modulation section 46 has set the power-receiving-side load in a low-load state (first load state in a broad sense) in the reference value acquisition period. As shown in FIG. 20B, the control circuit 22 acquires a second reference value REB2 when the load modulation section 46 has set the power-receiving-side load in a high-load state (second load state in a broad sense). Specifically, the load state is changed by causing the transistor TB3 of the load modulation section 46 to be turned ON/OFF in the reference value acquisition period in a state in which the load 90 is not connected, and load state information is acquired as the reference values REFB1 and REFB2.

The control circuit 22 of the power-transmission-side instrument determines (detects) the power-receiving-side load state after starting normal power transmission using the threshold value set based on the reference values REFB1 and REFB2. Specifically, when the load modulation section 46 has transmitted data by changing the load state between the low-load state and the high-load state (first load state and second load state) after normal power transmission has started, the control circuit 22 determines the data transmitted from the power-receiving-side instrument using the threshold value SIGH set based on the reference values REFB1 and REFB2, for example. This enables a determination process taking into account a change in the load state detection information (e.g., the pulse width period count value) due to a change in the power-receiving-side load state so that the detection accuracy of the determination process can be further improved.

10. Load State Detection Circuit

The above description has been given taking an example in which the load state detection circuit 30 detects a change in load by detecting the pulse width. Note that this embodiment is not limited thereto. The load state detection circuit 30 may detect a change in load by detecting a current or an amplitude.

Figure 21A:
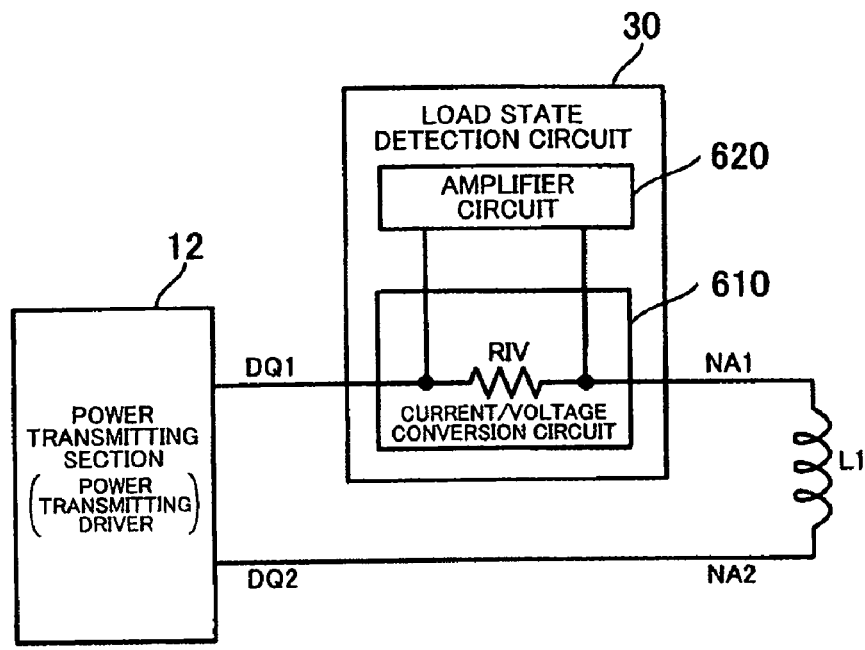
FIGS. 21A and 21B show modifications of a load state detection circuit.

FIG. 21A shows a configuration example of the load state detection circuit 30 that detects the load state by detecting a current. In FIG. 21A, the load state detection circuit 30 includes a current/voltage conversion circuit 610 and an amplifier circuit 620. The current/voltage conversion circuit 610 that includes a resistor RIV detects a current that flows at the coil end, and converts the detected current into a voltage. The amplifier circuit 620 amplifies the converted voltage, and the power-receiving-side load state is detected based on the amplified signal. Specifically, the power-receiving-side load state can be detected by comparing the phase difference between the coil end current and the coil end voltage.

Figure 21B:
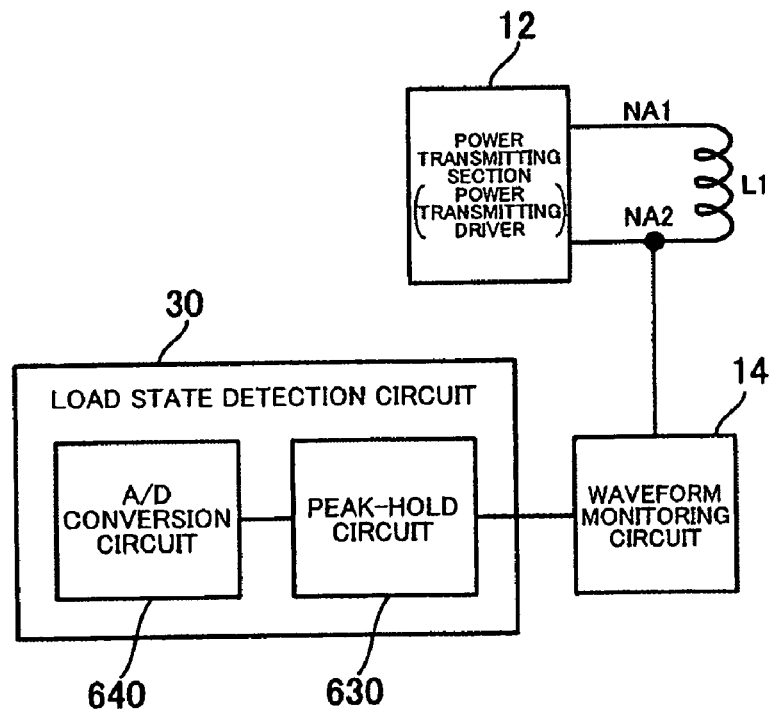

In FIG. 21B, the load state detection circuit 30 includes a peak-hold circuit 630 (amplitude detection circuit) and an A/D conversion circuit 640. The peak-hold circuit 630 holds the peak of the induced voltage signal PHIN from the waveform monitoring circuit 14 to detect a peak voltage (amplitude information in a broad sense). The A/D conversion circuit 640 converts the detected peak voltage into digital data. The control circuit 22 determines the power-receiving-side load state based on the digital data. As shown in FIG. 3B, the control circuit 22 determines that the power-receiving-side load is low when the peak voltage (amplitude) is low, and determines that the power-receiving-side load is high when the peak voltage (amplitude) is high, for example.

Although the embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings. The invention also includes any combinations of the embodiments and the modifications. The configurations and the operations of the power transmission control device, the power transmitting device, the power reception control device, the power receiving device, the foreign object detection method, and the pulse width detection method are not limited to those described relating to the above embodiments. Various modifications and variations may be made.

What is claimed is:

1. A power transmission control device that controls power transmission of a power transmitting device of a non-contact power transmission system, the non-contact power transmission system transmitting power from the power transmitting device to a power receiving device by electromagnetically coupling a primary coil and a secondary coil, and supplying the power to a load of the power receiving device, the power transmission control device comprising:
- a driver control circuit that controls a power transmitting driver that drives the primary coil;
- a load state detection circuit that detects a power-receiving-side load state; and
- a control circuit that controls the power transmission control device,
- the control circuit acquiring a reference value in a reference value acquisition period, the reference value being used to determine the power-receiving-side load state after starting normal power transmission, the reference value acquisition period being a period after receiving ID authentication information from the power receiving device, but before starting the normal power transmission.

2. The power transmission control device as defined in claim 1,
- the control circuit acquiring the reference value in a period in which the power receiving device does not supply power to the load.

3. The power transmission control device as defined in claim 1,
- the control circuit transmitting permission information to the power receiving device before performing the normal power transmission after the reference value acquisition period, the permission information corresponding to the ID authentication information from the power receiving device.

4. The power transmission control device as defined in claim 1,
- the control circuit setting a drive frequency of the power transmitting driver at a normal power transmission frequency in the reference value acquisition period.

5. The power transmission control device as defined in claim 1,
- the control circuit calculating a foreign object detection threshold value based on the reference value, and performing a foreign object detection process after starting the normal power transmission based on the foreign object detection threshold value.

6. The power transmission control device as defined in claim 1,
- the control circuit calculating a data detection threshold value based on the reference value, and detecting data transmitted from the power receiving device after starting the normal power transmission based on the data detection threshold value.

7. The power transmission control device as defined in claim 1,
- the power receiving device including a load modulation section that variably changes a power-receiving-side load;
- the control circuit acquiring a first reference value when the load modulation section has set the power-receiving-side load in a first load state in the reference value acquisition period, and acquiring a second reference value when the load modulation section has set the power-receiving-side load in a second load state in the reference value acquisition period; and
- the control circuit determining the power-receiving-side load state after starting the normal power transmission using a threshold value set based on the first reference value and the second reference value.

8. The power transmission control device as defined in claim 1,
- the load state detection circuit including a pulse width detection circuit that detects pulse width information relating to an induced voltage signal of the primary coil; and
- the control circuit acquiring a reference value relating to the pulse width information in the reference value acquisition period.

9. The power transmission control device as defined in claim 8, further comprising:
- a drive clock signal generation circuit that generates and outputs a drive clock signal that specifies a drive frequency of the primary coil,
- the load state detection circuit including a first pulse width detection circuit that measures a first pulse width period and detects first pulse width information, the first pulse width period being a period between a first edge timing of the drive clock signal and a first timing, the first timing being a timing when a first induced voltage signal of the primary coil that has changed from a low-potential power supply side exceeds a first threshold voltage.

10. The power transmission control device as defined in claim 9,
- the load state detection circuit including a first waveform adjusting circuit that adjusts a waveform of the first induced voltage signal and outputs a first waveform-adjusted signal; and
- the first pulse width detection circuit measuring the first pulse width period based on the first waveform-adjusted signal and the drive clock signal.

11. The power transmission control device as defined in claim 10,
- the first pulse width detection circuit including a first counter that increments or decrements a count value in the first pulse width period, and measures the first pulse width period based on the resulting count value.

12. The power transmission control device as defined in claim 11,
- the first pulse width detection circuit including a first enable signal generation circuit that receives the first waveform-adjusted signal and the drive clock signal, and generates a first enable signal that becomes active in the first pulse width period; and
- the first counter incrementing or decrementing the count value when the first enable signal is active.

13. The power transmission control device as defined in claim 9,
- the load state detection circuit including a second pulse width detection circuit that measures a second pulse width period and detects second pulse width information, the second pulse width period being a period between a second edge timing of the drive clock signal and a second timing, the second timing being a timing when a second induced voltage signal of the primary coil that has changed from a high-potential-side power supply has exceeded a second threshold voltage; and
- the control circuit acquiring a reference value for at least one of the first pulse width information and the second pulse width information in the reference value acquisition period.

14. A non-contact power transmission system comprising a power transmitting device and a power receiving device, the non-contact power transmission system transmitting power from the power transmitting device to the power receiving device by electromagnetically coupling a primary coil and a secondary coil, and supplying the power to a load of the power receiving device, the power receiving device including:
a power receiving section that converts an induced voltage of the secondary coil into a direct-current voltage; and
a load modulation section that variably changes a load corresponding to transmission data when the power receiving device transmits data to the power transmitting device; and
the power transmitting device including:
a driver control circuit that controls a power transmitting driver that drives the primary coil;
a load state detection circuit that detects a power-receiving-side load state; and
a control circuit that controls the power transmission control device,
the control circuit acquiring a reference value in a reference value acquisition period, the reference value being used to determine the power-receiving-side load state after starting normal power transmission, the reference value acquisition period being a period after receiving ID authentication information from the power receiving device, but before starting the normal power transmission.

* * * * *